United States Patent [19]
Kishibuchi et al.

[11] Patent Number: 5,683,299
[45] Date of Patent: Nov. 4, 1997

[54] DEVICE FOR TRANSMITTING ROTATIONAL POWER

[75] Inventors: Akira Kishibuchi, Nagoya; Kiyomi Okuda, Kariya; Junichi Toyama, Nagoya; Yasuo Takahara, Anjo; Kazuo Oyobe, Toyoake, all of Japan

[73] Assignee: Nippondenso Co., Ltd., Kariya, Japan

[21] Appl. No.: 527,821

[22] Filed: Sep. 13, 1995

[30] Foreign Application Priority Data

| Sep. 14, 1994 | [JP] | Japan | 6-219693 |
| Sep. 16, 1994 | [JP] | Japan | 6-221697 |
| Mar. 8, 1995 | [JP] | Japan | 7-048038 |
| Apr. 20, 1995 | [JP] | Japan | 7-095220 |

[51] Int. Cl.$^6$ .................................. F16H 35/10
[52] U.S. Cl. .......... 464/88; 192/55.1; 192/209; 192/84.961
[58] Field of Search .................. 192/84 C, 200, 192/209, 56.41, 55.1, 55.2, 55.3, 30 V, 84.961; 464/37, 88, 92, 93

[56] References Cited

U.S. PATENT DOCUMENTS

| 3,199,313 | 8/1965 | Paulsen . |
| 3,618,310 | 11/1971 | Balchunas . |

FOREIGN PATENT DOCUMENTS

| 0 590 794 | 4/1994 | European Pat. Off. . |
| 2146778 | 2/1973 | France . |
| 6-14104 | 4/1994 | Japan . |
| 6109031 | 4/1994 | Japan . |
| 2 138 893 | 10/1984 | United Kingdom . |
| PCT/WO82/00183 | 1/1982 | WIPO . |

Primary Examiner—Charles A. Marmor
Assistant Examiner—Saúl J. Rodriguez
Attorney, Agent, or Firm—Cushman, Darby & Cushman IP Group of Pillsbury Madison & Sutro LLP

[57] ABSTRACT

A device for transmitting rotational power from a rotational power source to a rotational driven member is provided with a first rotating member provided for rotation in a rotational direction about an axis, and a second rotating member provided for rotation about the same axis. The first rotating member is connected to the rotational power source and the second rotating member is connected to the rotational driven member. An mechanism for rotationally connecting the first and second rotating member is provided. The connecting mechanism is provided with at least one elastic member made of a rubber material; a first holder member for holding the elastic member from the radially outside of the elastic member; and a second holder member for holding the elastic member from the radially inside of the elastic member. The first and second holder members are mounted to one of the first and second rotating members. The first and second holder members radially cooperate with each other to circumferentially hold the at least one elastic member during normal operation to transmit the rotation. The first and second holder members are disconnected by the deformation of the at least one elastic member when a relative rotation between the first and second rotating members occurs.

8 Claims, 28 Drawing Sheets

5,683,299

DEVICE FOR TRANSMITTING ROTATIONAL POWER

BACKGROUND OF THE INVENTION

1. Field of the Invention

The invention relates to a device for transmitting rotational power from a rotational power source such as an automobile engine to a rotational driven device such as a refrigerant compressor for an air conditioner. The device can rotationally separate the driven device from the rotational power source when a torque transmitted exceeds a predetermined value, that is, the device functions as a torque limiter.

2. Description of the Related Art

Japanese Examined Utility Model Publication (Kokoku) No. 6-14104 describes a rotational power transmission device which has a torque limiting function. The device comprises a drive member which is connected to the crank shaft of an automobile engine through a belt, a driven member which is connected to a shaft of a compressor, and a connecting mechanism between the drive and driven members, which mechanism is provided with levers of rigid material and a spring which is made of a metallic material, in the form of a ring, which engages the levers. The drive member is rotationally connected to the driven member by the engagement between the levers and the spring.

When the drive shaft of the compressor is locked by a failure such as seizing in the compressor and the torque on the connecting mechanism exceeds a predetermined level, the drive levers apply a force on the spring to deform the spring. The deformation of the spring disconnects the engagement between the levers and the spring.

The prior art rotational power transmission device, however, cannot absorb a fluctuation in the torque applied to the device since a metallic spring is used to connect the drive member to the driven member. Therefore, in order to absorb a fluctuation in torque, an additional device must be provided, which increases the production cost.

Further, an air conditioning apparatus for an automobile comprises a compressor for compressing a refrigerant gas. The compressor is connected to the crank shaft of the automobile engine through an electro-magnetic clutch and belts. The belts also connect other devices, such as an alternator and a water pump, to the engine. When a failure such as seizing in the compressor occurs and the drive shaft of the compressor is locked, the belts are worn and broken so that the other devices cannot operate. This results in the automobile engine stopping.

In order to prevent this, in the prior art, the rotation of the compressor is detected in order to deenergize the electromagnetic clutch when the rotation of the compressor is reduced. However, a device for detecting the rotation of the compressor and a controller for the device must be provided, which again increases the production cost.

SUMMARY OF THE INVENTION

The invention is directed to solve the above problems, and the objective of the invention is to provide a rotational power transmission device with a torque limiting function which can absorb a fluctuation in torque.

Further, the objective of the invention is to provide an air conditioning apparatus which comprises the rotational power transmission device.

Further, the objective of the invention is to provide an electro-magnetic clutch with a torque limiting function.

Further, the objective of the invention is to provide an air conditioning apparatus which comprises the electro-magnetic clutch.

According to the invention, there is provided a device for transmitting rotational power from a rotational power source to a rotational driven member. The device comprises a first rotating member provided for rotation in a rotational direction about an axis, and a second rotating member provided for rotation about the axis. The first rotating member is connected to the rotational power source and the second rotating member is connected to the rotational driven member. A means for rotationally connecting the first and second rotating member is provided. The connecting means comprises at least one elastic member made of a rubber material; a first holder member for holding the elastic member from the radially outside of the elastic member; and a second holder member for holding the elastic member from the radially inside of the elastic member. The first and second holder members are mounted to one of the first and second rotating members. The first and second holder members radially cooperate with each other to circumferentially hold the at least one elastic member during normal operation to transmit the rotation. The first and second holder members are disconnected by the deformation of the at least one elastic member when a relative rotation between the first and second rotating members occurs.

The elastic member of a rubber material can absorb a fluctuation in the torque on the device.

According to the preferred embodiment of the invention, the elastic member comprises a plurality of cylindrical members. The elastic members are mounted to the second or first rotating member, to which the holder members are not mounted, by pins secured to the rotating member. The first holder member comprises a plurality of first arm members which extends substantially circumferentially. The first arm members have first ends toward the rotational direction and second opposite ends. The first arm members are equally spaced along a circle about the axis to hold the elastic members from the radially outside thereof. The second holder member also comprises a plurality of second arm members which extend substantially circumferentially. The second arm members have first ends toward the rotational direction and second opposite ends. The second arm members are arranged along a circle about the axis to hold the elastic members from the radially inside thereof. Further, the second arm members are radially aligned to the respective first arm members to positively engage the respective cylindrical members with the first arm members.

The cylindrical members may be mounted to the first rotational member. In this case, the first ends of the first and second arm members are separated by a distance smaller than the diameter of the cylindrical members to provide first openings, and the second ends of the first and second arm members are separated by a distance longer than the diameter of the cylindrical members to provide second openings. The cylindrical members are released from the aligned first and second arm members through the first openings by an elastic deformation thereof to disconnect the positive engagements when a relative rotation between the first and second rotating members occurs.

Preferably, the first and second arm members include extension portions which extend from the first ends while forming rounded corners between the first ends and the extension portions. The rounded corners facilitate the release of the cylindrical members through the first opening which prevents wear and tear on the cylindrical members.

On the other hand, in case that the cylindrical members are mounted to the second rotational member, the first ends of the first and second arm members are separated by a distance longer than the diameter of the cylindrical members to provide first openings, and the second ends of the first and second arm members being separated by a distance smaller than the diameter of the cylindrical members to provide second openings. The cylindrical members are released from the aligned first and second arm members through the second openings by an elastic deformation of the cylindrical members to disconnect the positive engagements when a relative rotation between the first and second rotating members occurs.

Preferably, the first and second arm members include extension portions which extend from the second ends while forming rounded corners between the second ends and the extension portions. The rounded corners facilitate the release of the cylindrical members through the second opening which prevents wear and tear on the cylindrical members.

According another embodiment, the elastic member and the first and second members are substantially formed into a ring shape. The first holder member is mounted to the first rotating member to engage the outer periphery of the elastic member, and the second holder member is mounted to the second rotating member to engage the inner periphery of the elastic member. The first and second holder members include a peripheral shape to provide an engagement force in the rotational direction. The elastic member also includes a peripheral shape substantially complementary to the peripheral shape of the first and second holder members to provide a positive engagement therebetween.

Preferably, the peripheral shapes are constructed by a plurality of outwardly convex and concave portions alternatively arranged along at least the outer or inner periphery thereof.

According to the preferred embodiment, the rotational power source is an engine for an automobile which has an air conditioning apparatus with a refrigerant compressor for executing a refrigerating cycle. The compressor can be of a clutchless type in which its displacement is continuously varied. The driven member is a drive shaft of the compressor. That is, according to the other feature of the invention, there is provided an air conditioning apparatus for an automobile.

The automobile is provided with an automobile engine. The air conditioning apparatus comprises a compressor for compressing a refrigerant gas. The compressor comprises means for compressing the refrigerant gas, and a drive shaft to move pistons. The air conditioning apparatus further comprises a device for transmitting rotational power from the automobile engine to the drive shaft of the compressor. The rotational transmission device comprises a first rotating member provided for rotation in a rotational direction about an axis, and a second rotating member provided for rotation about the axis. The first rotating member is connected to the automobile engine and the second rotating member is connected to the drive shaft of the compressor. A means for rotationally connecting the first and second rotation member is provided. The connecting means comprises at least one elastic member made of a rubber material; a first holder member for holding the elastic member from the radially outside of the elastic member; and a second holder member for holding the elastic member from the radially inside of the elastic member. The first and second holder members are mounted to one of the first and second rotating members.

The first and second holder members radially cooperate with each other to circumferentially hold the at least one elastic member during normal operation to transmit the rotation. The first and second holder members are disconnected by the deformation of the at least one elastic member when a relative rotation between the first and second rotating members occurs.

According to another feature of the invention, there is provided an electro-magnetic clutch for transmitting rotational power from a rotational power source to a rotational driven member. The clutch comprises a first rotating member provided for rotation in a rotational direction about an axis, and a second rotating member provided for rotation about the axis. The first rotating member is connected to the rotational power source, and the second rotating member is connected to the rotational driven member. The first rotating member defines a friction surface. The clutch further comprises a means for generating an electro-magnetic attractive force, when electrically energized, on an armature arranged to face the friction surface of the first rotating member. The electro-magnetic attractive force causes the armature to contact the friction surface of the first rotating member. A means for connecting the armature and second rotating member is provided. The connecting means comprises at least one elastic member; a holder member for circumferentially holding the at least one elastic member during normal operation to transmit the rotation. The at least one elastic member and the holder member being disconnected due to the deformation of the at least one elastic member when a relative rotation between the first and second rotating members occurs.

According to the preferred embodiment, the holder member comprises a first holder member for holding the at least one elastic member from the radially outside of the at least one elastic member; and a second holder member for holding the at least one elastic member from the radially outside of the at least one elastic member; and a second holder member for holding the elastic member from the radially inside of the elastic member. The first holder member is mounted to the armature and the second holder member is mounted to the second rotating member. During normal operation, the first and second holder members radially cooperate with each other to circumferentially hold the elastic member to transmit the rotation. The first and second holder members are disconnected by the deformation of the elastic member when a relative rotation between the first and second rotating members occurs.

According to the preferred embodiment, the armature comprises a first armature in the form of a ring which is provided for rotation about the axis, and a second armature in the form of a ring, which has a radius smaller than that of the first armature and is provided for rotation about the axis. The first armature is movable in the axial direction between a connecting position where the first armature engages the first rotating member and a disconnecting position where the first armature is separated from the first rotating member by a first gap therebetween. The second armature is movable in the axial direction between a connecting position where the second armature engages the second rotating member and a disconnecting position where the second armature is separated from the second rotating member by a second gap therebetween. The second gap is wider than the first gap. Therefore, the first armature contacts the friction surface before the second armature, which reduces a fluctuation in torque when the armatures engage the friction surface.

BRIEF DESCRIPTION OF THE DRAWINGS

These and other objects and advantages and further description will now be discussed in connection with the drawings in which.

DESCRIPTION OF THE PREFERRED EMBODIMENTS

Figure 1:
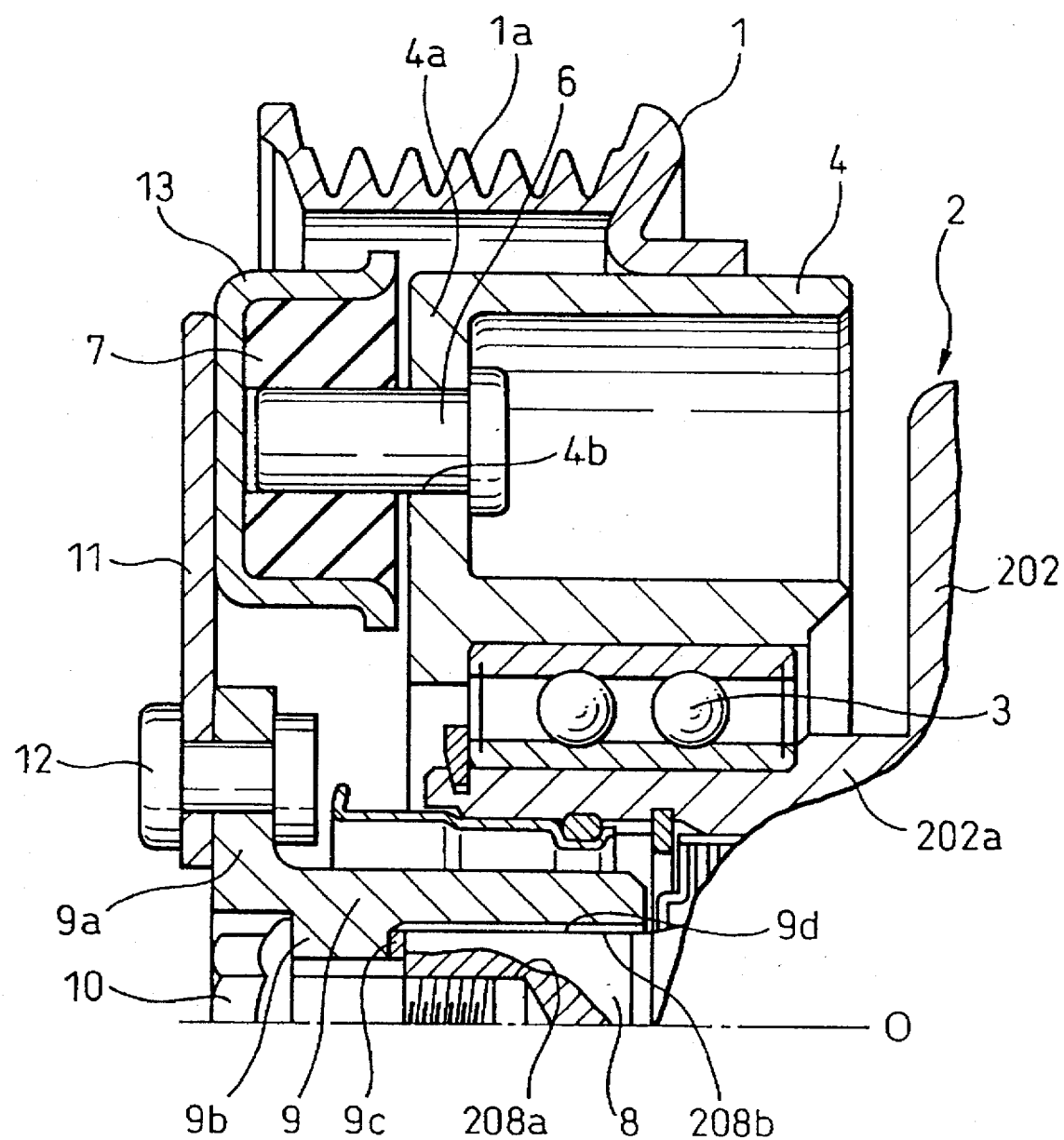
FIG. 1 is a partial section of the device for transmitting rotational power according to the first embodiment of the invention in which the device is mounted to a drive shaft of a compressor as an example.
Figure 2:
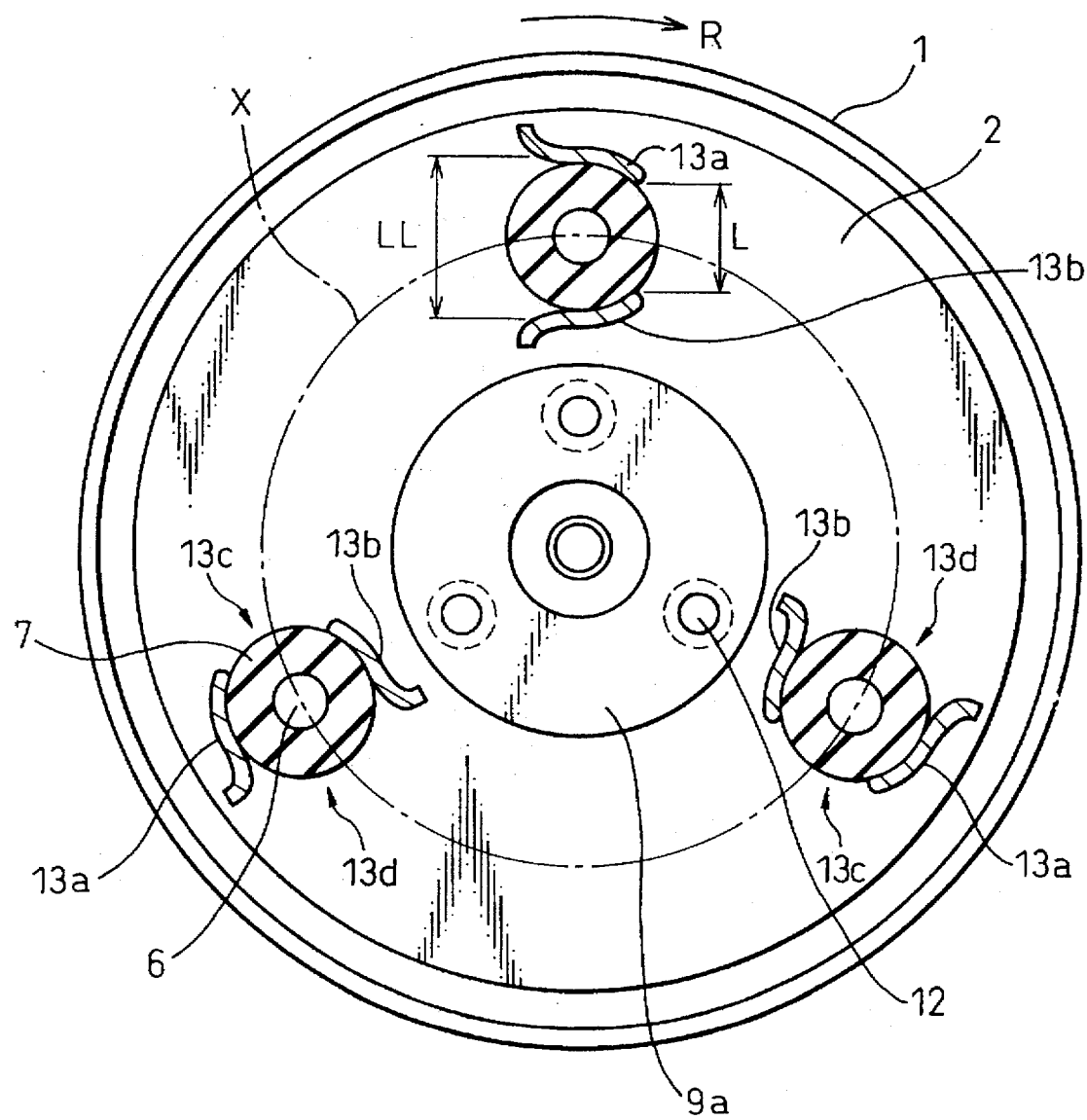
FIG. 2 is a front view of the device of FIG. 1 in which the device is removed from the drive shaft of the compressor.

With reference to FIGS. 1 and 2, a rotational power transmission device according to the first embodiment of the invention is illustrated. The rotational power transmission device comprises a pulley 1 for receiving driving power from a rotational power source, for example, an automobile engine (not shown). The pulley 1 has rim 1a with V-shaped grooves directed to engage V-shaped belts 15 (see FIG. 3).

Figure 3:
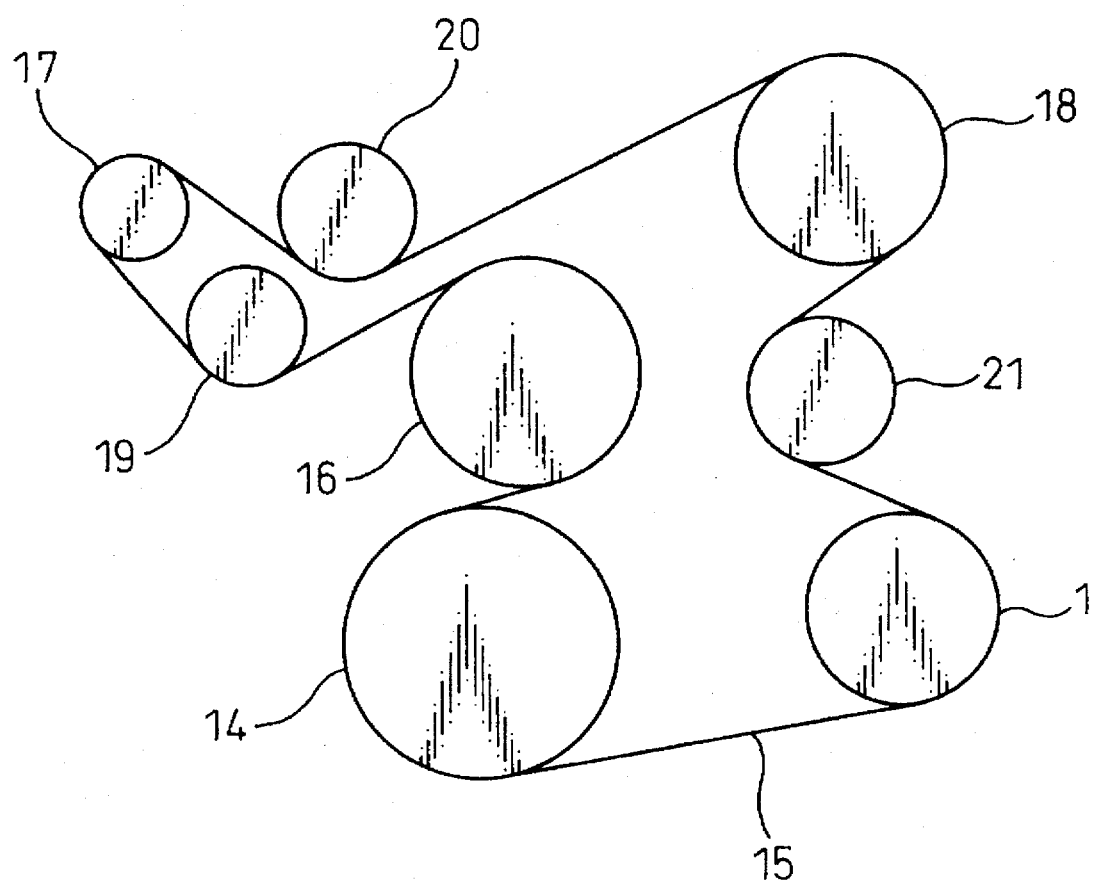
FIG. 3 illustrates a system diagram of devices on an automobile engine to which the device of the invention is applied.

In FIG. 3, a drive system for devices on the automobile engine is illustrated as an example. The system comprises a crank pulley 14 which is connected to the crank shaft of the automobile engine as a rotational power source for the devices. The belts 15 extend from the crank pulley 14 via a water pump pulley 16 of a water pump in a cooling system for the engine, an alternator pulley 17 of an alternator for charging a battery, a hydraulic pump pulley 18 of a hydraulic pump for a power steering system, and the pulley 1. Tension pulleys 19, 20 and 21 are provided for applying a tension to the belts 15.

Referring to FIG. 1 and 2 again, the pulley 1 is connected to a rotor 4 by an appropriate connecting method such as welding. The rotor 4 is formed in to a double-ring shape and includes an end wall 4a which connects the outer ring and inner ring to each other. The rotor 4 is rotationally mounted to a cylindrical support 262a of a driven device such as a refrigerant compressor 2 which is adapted for use in a refrigerating system for an air conditioning apparatus of an automobile, through a bearing 3. The cylindrical support 202a outwardly extends from a front flange 202 of the compressor 2 along an axis O of the compressor.

Figure 4:
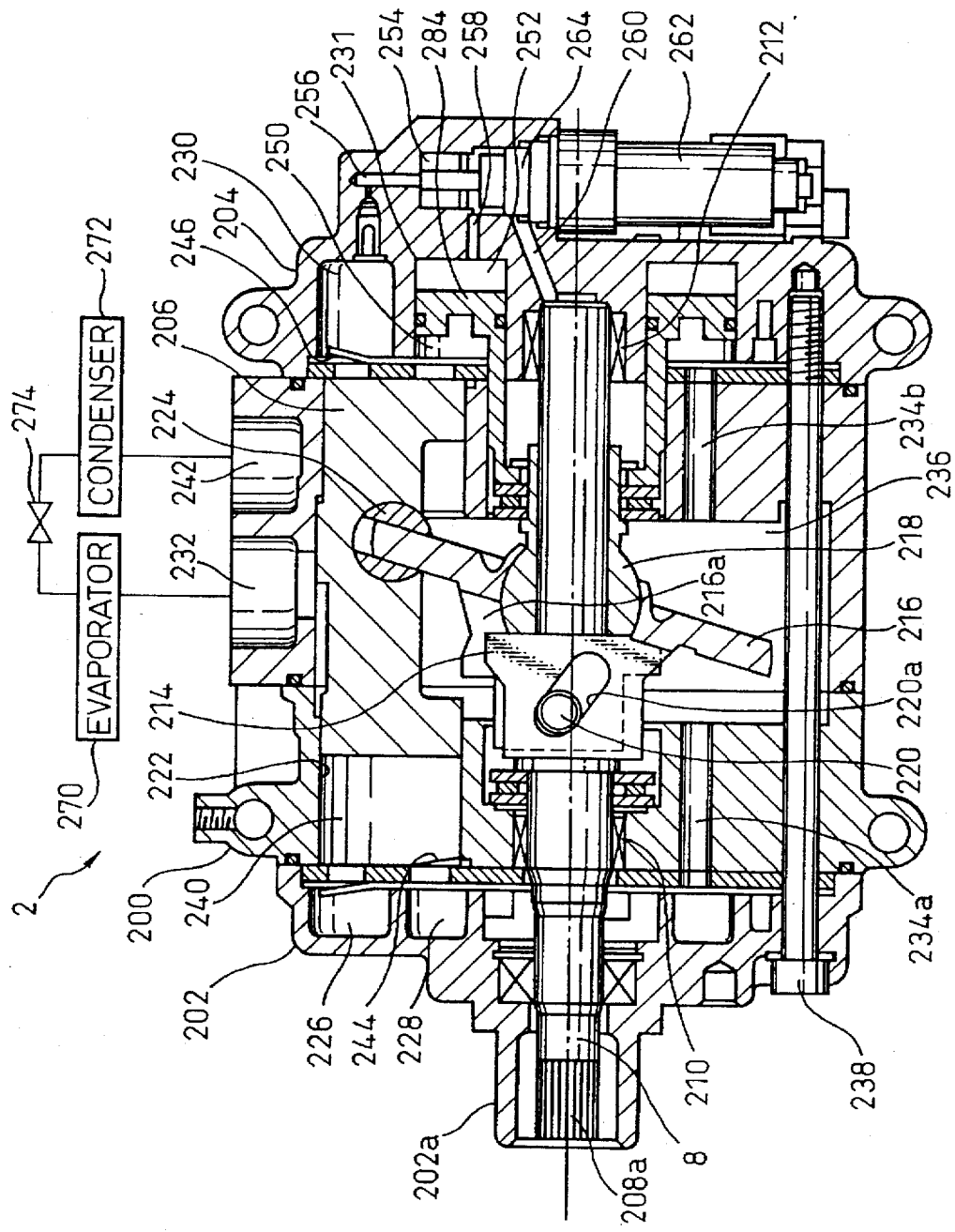
FIG. 4 is a longitudinal section of the compressor of clutchless type which can vary its displacement continuously.

With reference to FIG. 4, an example of the compressor 2 is shown, which is a variable displacement type compressor. The compressor 2 comprises a housing 200, front and rear flanges 202 and 204 which are attached to the respective ends of the housing 200 by a plurality of bolts 238, and a drive shaft 8. The housing 200 includes a plurality of cylinder bores 222 arranged in parallel around the drive shaft 8 which has a spline portion 208a at one end thereof, and a central swash plate chamber 236. In the cylinder bores 222, double-headed pistons 206 are slidably provided for reciprocation. The inner surface of the cylinder bores 222 and the end faces of the double-headed pistons 206 form compression chambers 240 in which a refrigerant gas is compressed.

The front flange 202 includes a discharge chamber 226 and a suction chamber 228. The rear flange 204 includes a discharge chamber 230 and an actuator chamber 231. In the actuator chamber 231, a plunger 284 is provided and is slidable in the axial direction. The plunger 284 separates the actuator chamber 231 into a suction chamber 250 and a control chamber 252. The suction chambers 228 and 250 in the front and rear flanges 202 and 204 are fluidly connected to an evaporator 270 through a laterally extended inlet port 232 and inlet passages 234a and 234b. The discharge chambers 226 and 230 in the front and rear flanges 202 and 204 are fluidly connected to a condenser 272 through a laterally extended outlet port 242 and outlet passages (not shown) in the housing 200. The condenser 272 and the evaporator 270 are connected to each other through an expansion valve 274. The compressor 2, the condenser 272, the expansion valve 274 and the evaporator 270 provide a refrigerating system for an air conditioner adapted for use in an automobile.

The drive shaft 8 extends through the housing 202, and is rotationally mounted to the housing 200 at each end thereof by bearings 210 and 212. The drive shaft 8 has a flat portion 214 in the form of a plate. The flat portion 214 includes an inclined slot 220a which extends through the flat portion 214.

The swash plate 216 is mounted on the drive shaft 8 by a spherical support 218 so that the angle between the swash plate 216 and the drive shaft 8 can be changed. The spherical support 218 is slidable along the drive shaft 8. The swash plate 216 has a pair of arm portions 216a (one is removed in the drawings) which are diametrically separated by a distance substantially equal to the width of the flat portion 214 and extend in parallel planes. The swash plate 216 is arranged so that the arm portions 216a contact either side of the flat portion 214. The positive engagement between the flat portion 214 and the arm portions 216a rotates the swash plate 216 with the drive shaft 8. A pin 220 is connected to the arm portions 216a and extends between the arm portions 216a through the slot 220a. The movement of the pin 220 within the slot results in the change of the angle of the swash plate 216.

The swash plate 216 engages the double-headed pistons 206 through shoes 224 socketed in the respective pistons 206. The rotation of the drive shaft 8 and the swash plate 216 causes reciprocation of the double-headed pistons 206. The pressure in the compression chambers 240 within which the pistons 206 move toward the bottom dead ends is reduced, whereby the refrigerant gas is introduced into the compression chambers form the corresponding suction chambers in the front and rear flanges 202 and 204 through inlet valves 244 which are provided between the compression chambers and the suction chambers. On the other hand, the pressure in the compression chambers within which the pistons 206 move toward the top dead ends is increased, whereby the refrigerant gas is discharged from the compression chambers to the corresponding discharge chambers 226 in the front and rear flanges 202 and 204 through outlet valves 246 which are provided between the compression chambers and the discharge chambers.

The rear flange 204 further includes a valve chamber 254 which is fluidly connected to the discharge chamber 230 through a passage 256, to the control chamber 252 through a passage 258, and to the suction chamber 250 through a passage 260. Within the valve chamber 254, a valve element 264 is slidably provided. The valve element 264 is connected to an electrical actuator 262. In order to control the pressure in the control chamber 252, the valve element 264 moves to switch the communication between the passages 258 and 256, and between the passages 258 and 260. The plunger 284 moves in the axial direction due to the differential pressure between the suction chamber 250 and the control chamber 252. The movement of the plunger 284 results in the movement of the spherical support 218 along the drive shaft 8.

Figure 5:
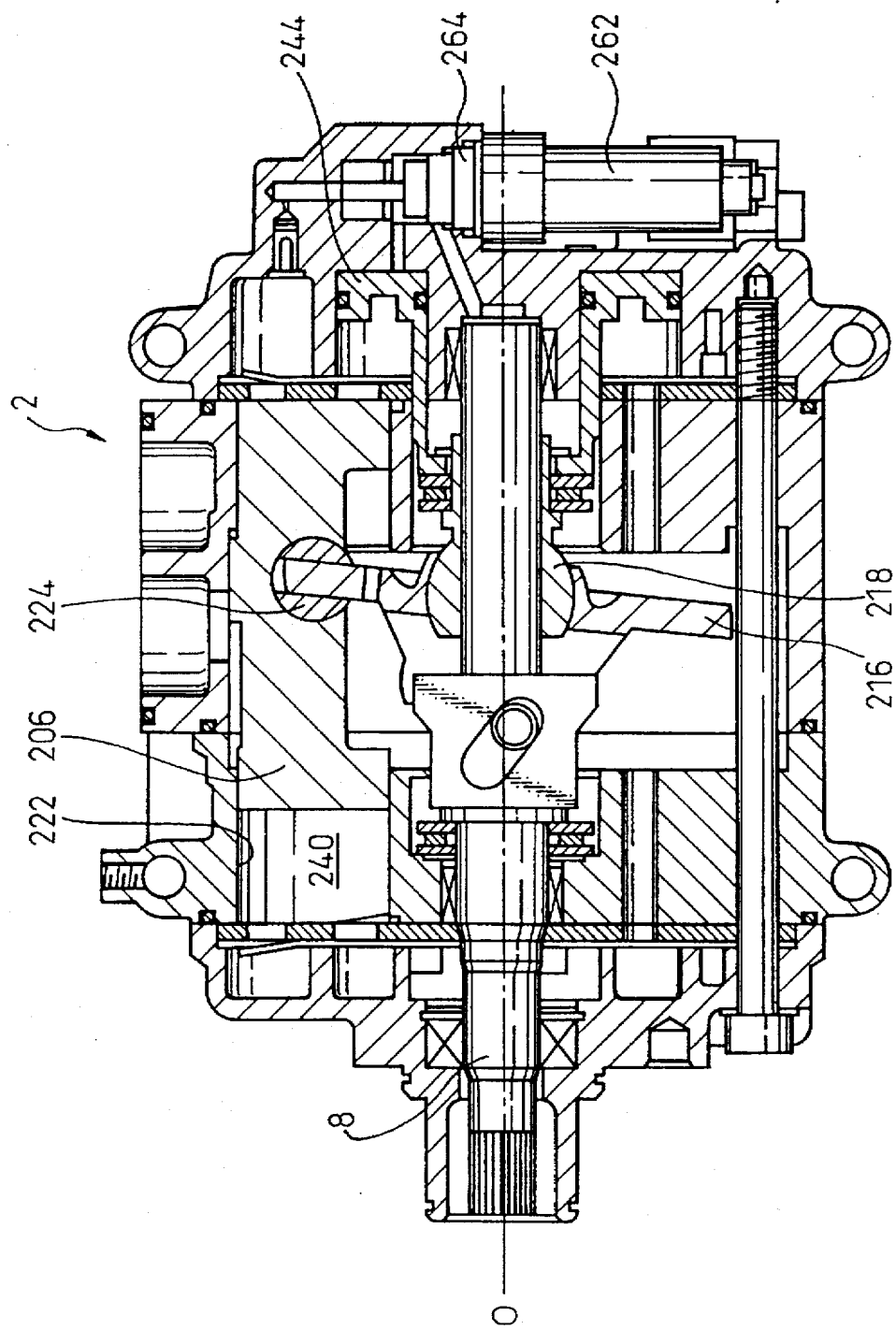
FIG. 5 is a section similar to FIG. 4 in which the displacement is reduced to substantially zero.

The support 218 is stopped at an axial position where the reaction force on the pistons 206 and the differential pressure between the suction chamber 250 and the control chamber 252 are balanced. When the support 218 moves along the drive shaft 8, for example, to the right as shown in FIG. 5, the pin 220 moves in the slot 220a to change the angle between the swash plate 216 and the drive shaft 8, which results in the change in the displacement of the compressor 2. In FIG. 5, the angle is increased, and the displacement is reduced since the stroke of the pistons 206 is reduced. The displacement can be reduced substantially to zero by making the swash plate 216 perpendicular to the drive shaft 8.

Referring to FIGS. 1 and 2 again, a plurality of cylindrical connection members 7 (in this embodiment three members) are mounted on the outer face of the end wall 4a by connecting pins 6. The connecting pins 6 are fitted into through holes 4b in the end wall 4a. The connection members 7 are equally spaced along a circle X about the axis O.

The connection members 7 are made of an elastic material, which can transfer a torque and absorb a variation on the torque, such as a rubber material of, preferably, chlorinated butyl rubber, acrylonitrile-butadien rubber or ethylene-propylene rubber.

A first hub 9 in the form of a cylindrical member with a flange portion at the end thereof is connected to the drive shaft 8 of the compressor 2. The first hub 9 includes a spline portion 9d on the inner surface which engages the mating spline 208b on the shaft, and a peripheral abutting portion 9b which extends along the inner surface of the first hub 9. The inner end face of the abutting portion 9b abuts the end face of the drive shaft 208a through a shim 9c therebetween to adjust the axial position of the first hub 9. The first hub 9 is mounted to the drive shaft 8 by a bolt 10 which fastened to a threaded hole 208a in the drive shaft 8. Thus, the first hub rotates with the drive shaft 8.

A second hub 11 in the form of a ring is connected to the flange portion 9a of the first hub 9 by pins 12. Holder members 13, which have first and second arm portions 13a and 13b, are secured on the inner face of the second hub 11 by a suitable method, such as welding. The first and second arm portions 13a and 13b extend substantially circumferentially. The holder members 13 are made of a suitable ferric metallic material such as cold rolled steel SPCC.

The first arm portions 13a have first ends toward the rotational direction R and second opposite ends. The first arm portions are equally spaced along a circle about the axis to hold the cylindrical connection members 7 from the radially outside thereof. The second arm portions 13b have first ends toward the rotational direction R and second opposite ends. The second arm portions 13b are arranged along a circle about the axis to hold the elastic portions from the radially inside thereof. Further, the second arm portions 13b are radially aligned to the respective first arm portions 13a to positively engage the respective connection members with the first arm portions 13a. The first and second ends of the first and second arm portions 13a and 13b define front and rear openings 13c and 13d therebetween.

The distance L between the first ends of the first and second arm portions 13a and 13b is smaller than the diameter of the connection members 7 to hold the connection members 7 during the normal rotation. Thus, the pulley 1 and the first and second hubs 9 and 11 are connected by the holder members 13 holding the connecting members 7 when the pulley 1 rotates in the normal direction R. On the other hand, the dimension LL between the second ends of the first and second arm portions 13a and 13b is longer than the diameter of the connection members 7 so that the connection members disconnected from the holder members 13 can enter the holder members 13 again during the normal rotation through the rear openings 13d.

The functional operation of the first embodiment will be described.

The rotation of the crank pulley 14 of the automobile engine is transmitted to the pulley 1 through the belts 15 (FIG. 3), which results in the rotation of the rotor 4. The connecting pins 6 and the connection members 7 rotate with the rotor 4. The second hub 11 is rotated through the positive engagement between the connection members 7 and the holder members 13 since the dimension L of the front openings 13c of the holder members 13 is smaller than the diameter of the connection members 7. Thus, the drive shaft 208 of the compressor 2 is rotated by the rotating pulley 1 through the rotor 4, the connecting pins 6, the connection members 7, the holder members 13, the second hub 11 and the first hub 9.

Figure 6:
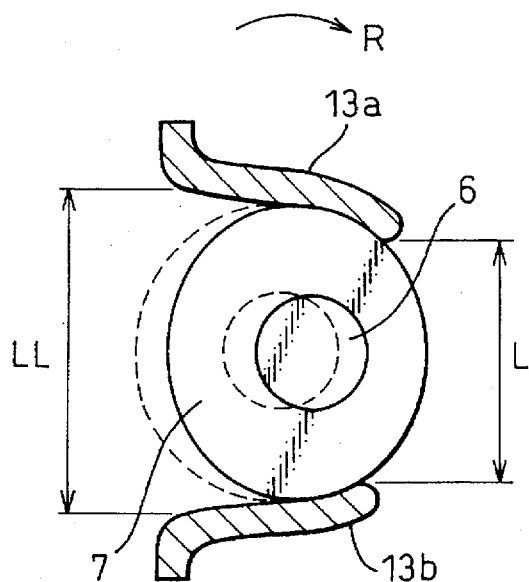
FIG. 6 is an enlarged illustration of the elastic member and the holder member according to the first embodiment of the invention.

During the normal operation of the compressor 2, a torque, in general about 20 Nm, about the drive shaft 208 is applied to the connection members 7. The torque on the connecting members 7 deforms them as shown in FIG. 6. In FIG. 6, the shape of the connection members 7 on which no torque about the drive shaft 8 is applied is shown by a broken line. However, the deformation of the connection members 7 cannot disconnect the connection members 7 and the holder members 13. In other words, the dimension of the front openings 13c is selected so that the holder members 13 do not release the connection members 7 by the deformation. Therefore, the deformation does not impair the transmission of the rotation from the pulley 1 to the drive shaft 8.

Figure 9:
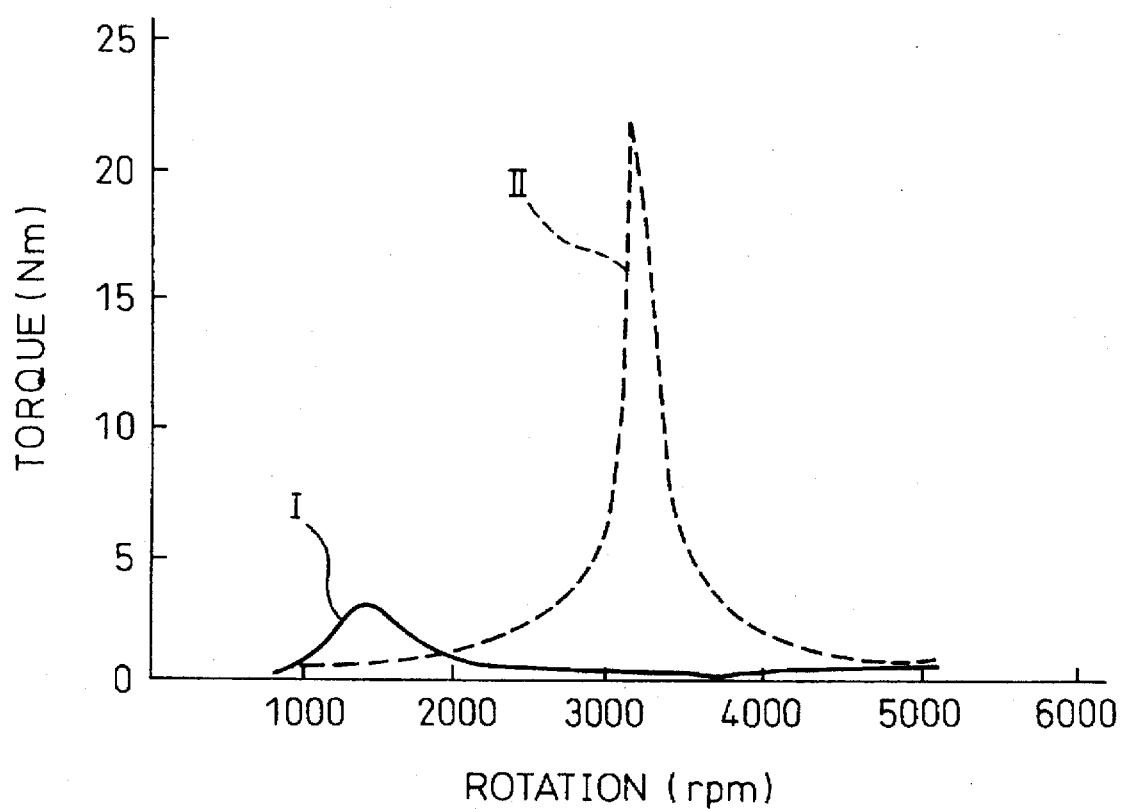
FIG. 9 illustrates the characteristics of the torque fluctuation absorption according to the invention.

Further, the elastic connection members 7 can absorb a fluctuation in torque. FIG. 9 illustrates the effect of the absorption of the torque fluctuation by the elastic connection members 7 in comparison with the prior art in which metallic springs are used to connect a pulley and a drive shaft of a compressor. In FIG. 9, the horizontal line is the rotation of the compressor 2, and the vertical line is the half amplitude of a fluctuation in the torque on the drive shaft 8 of the compressor 2. The torque fluctuation in the case where elastic connection members 7 are used is shown by curve I as a solid line, and the torque fluctuation in the prior art is shown by curve II as a broken line. As shown in FIG. 9, the peak of the torque fluctuation is shifted to the lower rotation, and the value of the fluctuation is reduced by the invention, which results in the reduction of the vibration of the compressor.

Figure 7:
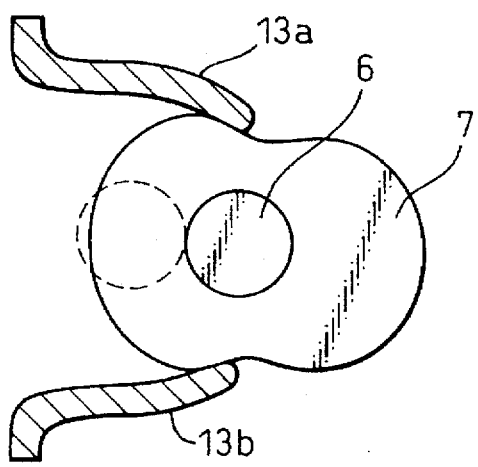
FIG. 7 is an illustration similar to FIG. 6 in which the elastic member is deformed.
Figure 8:
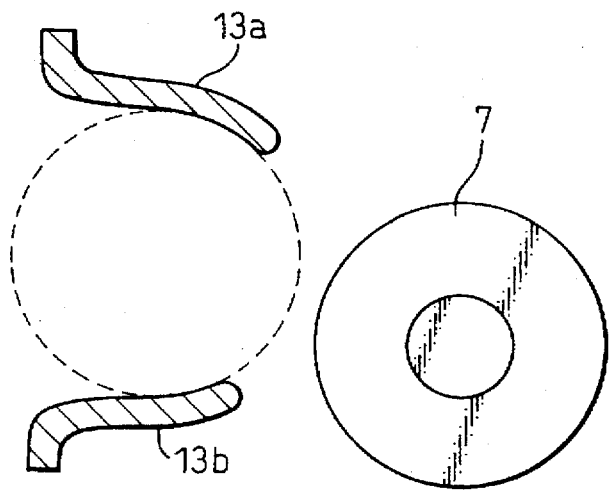
FIG. 8 is an illustration similar to FIG. 6 in which the elastic member is released from the holder member.

When the drive shaft 8 is locked due to the failure in the compressor 2 such as seizing, the deformation of the elastic connection members 7 is increased so that the connection members 7 are released from the holder members 13 as shown in FIGS. 7 and 8. Thus, the pulley 1 and the drive shaft 8 are disconnected.

However, the rotation of the pulley 1 does not stop which results in the connection members 7 entering the next holder members 13. The dimension of the rear openings 13d allow the connection members 7 to enter the holder members 13. Thus, the holder members 13 capture the connection members 7 again, and the capture and release of the connection members 7 is repeated. When the failure is slight and the drive shaft 8 is locked temporarily, the captured connection members 7 can transmit the rotation to the drive shaft 8 again. Thus, the compressor 2 can operate again automatically. When a significant failure in the compressor 2 occurs and the drive shaft 8 is permanently locked, wear and tear on the connection members 7 completely separates the drive shaft 8 from the pulley 1. Thus, the failure on the belts 15 or the other devices for the automobile engine is prevented.

Figure 10:
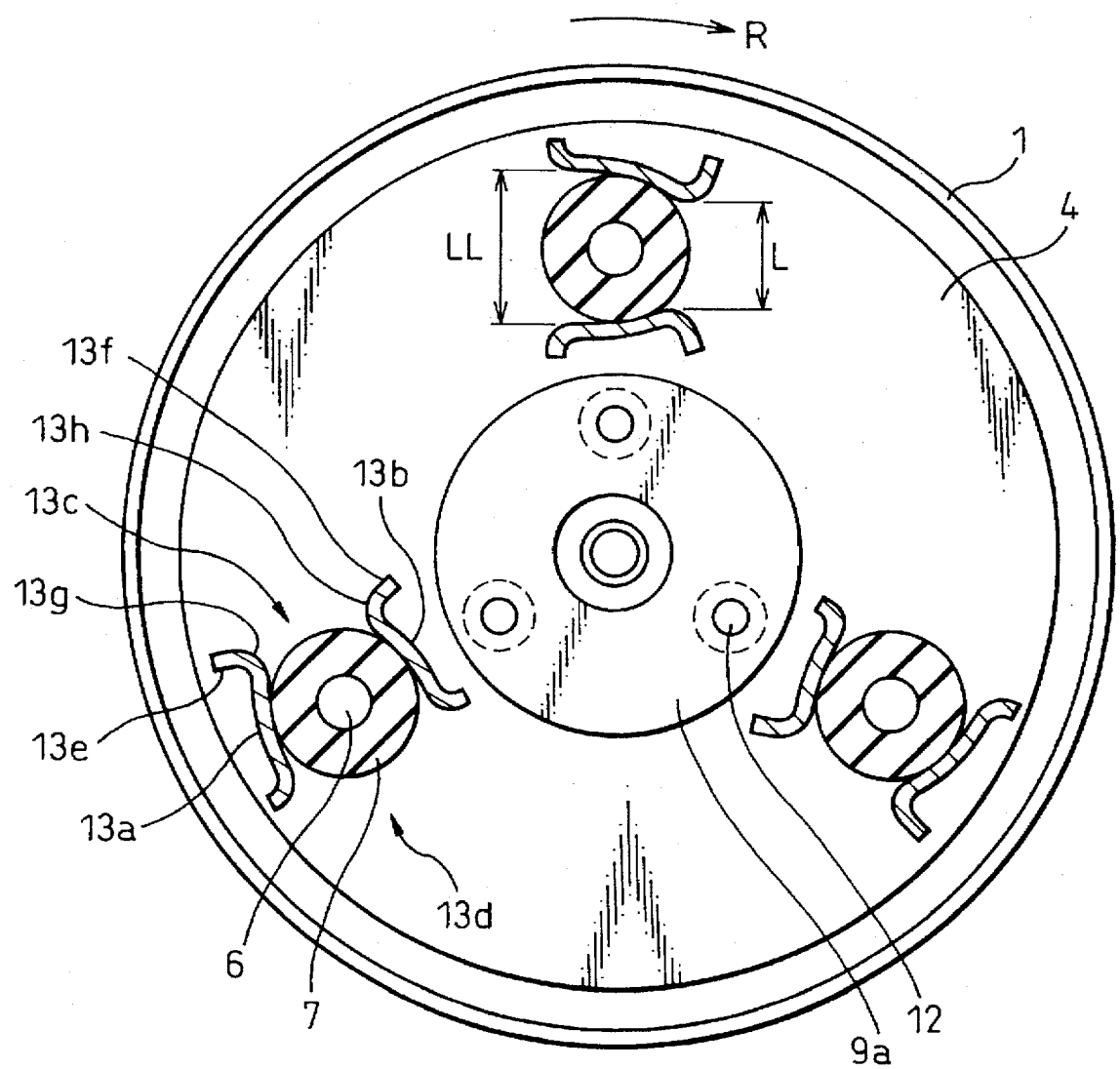
FIG. 10 is an illustration similar to FIG. 2 and is a front view a rotational power transmission device according to the second embodiment.

With reference to FIG. 10, the second embodiment of the invention will be described. In the drawing and the following description, the elements similar to those of the first embodiment are indicated by the same reference numbers.

A rotational power transmission device according to the second embodiment is substantially the same as in the first embodiment, except that, in the second embodiment, the first and second arms 13a and 13b of the holder members 13 include extension portions 13e and 13f at the first ends. Rounded corners 13g and 13h are made between the first ends and the extension portions 13g and 13h. The rounded corners 13g and 13h facilitate the exit of the elastic connection members 7 from the holder members 13 through the front openings 13c. Thus, the wear and tear on the connection members 7 are reduced. Preferably, the extension portions 13e and 13f are not connected to the second hub 11 and are compliant when the connection members 7 pass through the front openings 13c.

The operational function of the rotation transmission device according to the second embodiment is the same as in the first embodiment.

Figure 11:
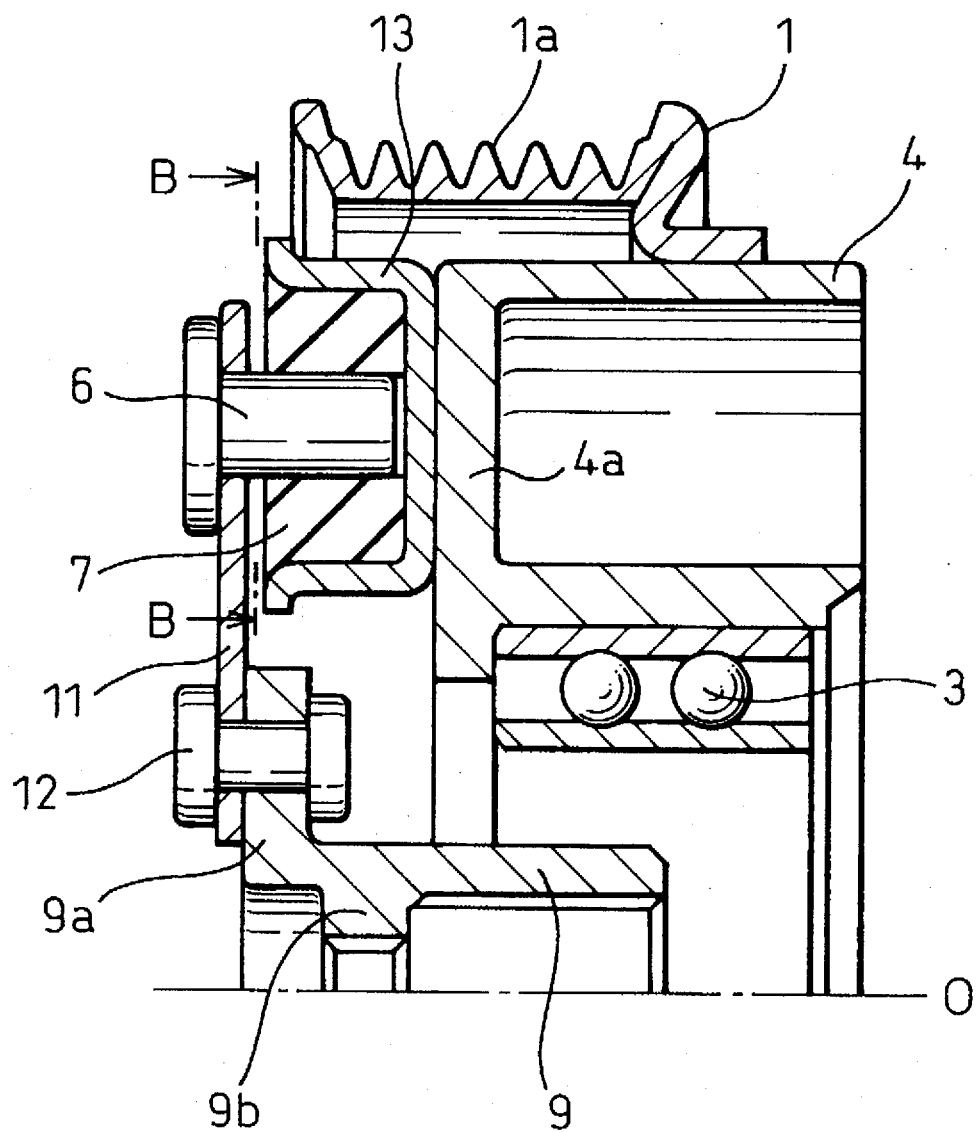
FIG. 11 is an illustration similar to FIG. 1 and is a partial section of a rotational power transmission device according to the third embodiment.
Figure 12:
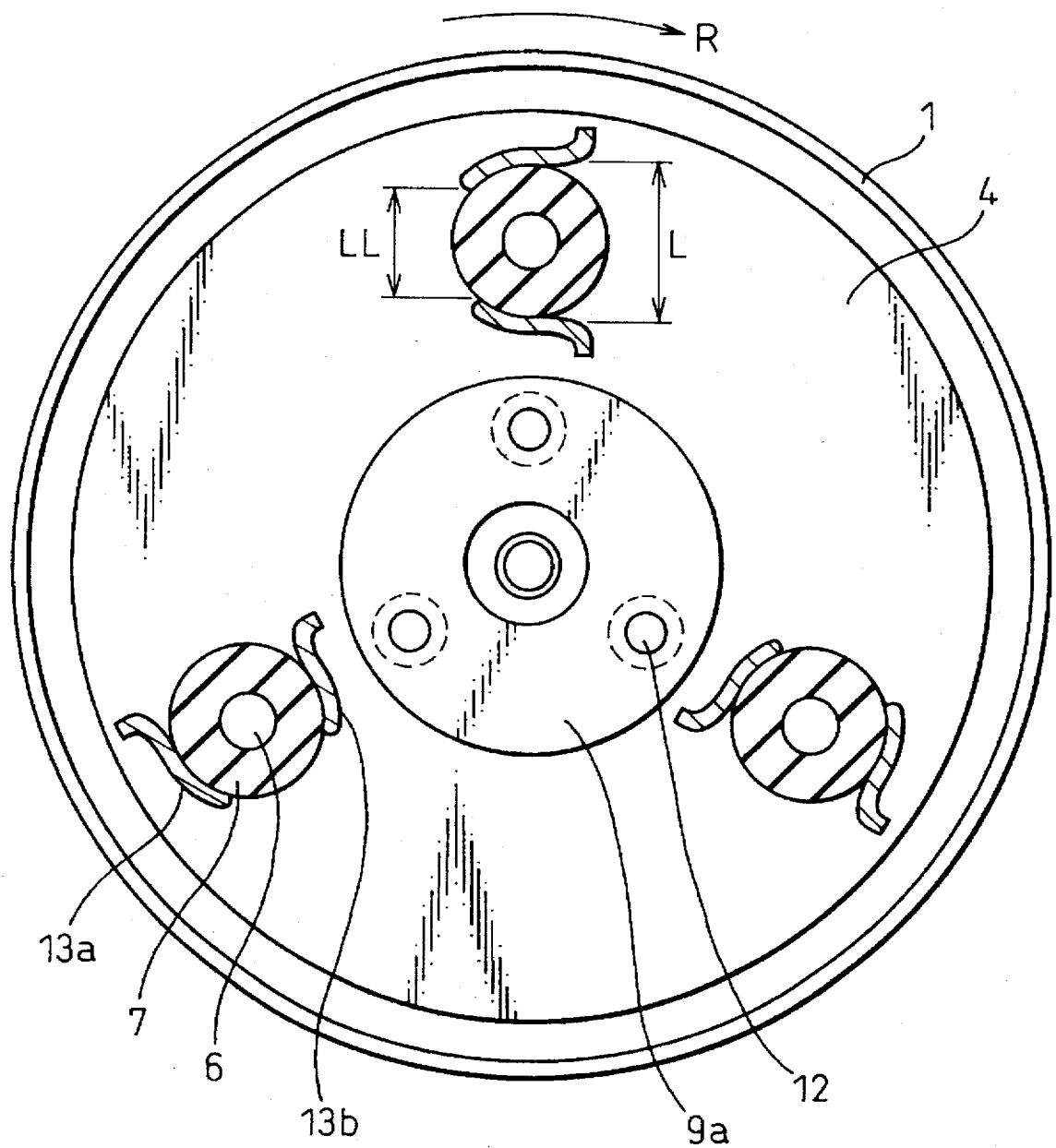
FIG. 12 is an illustration similar to FIG. 2 and is a front view a rotational power transmission device according to the third embodiment.

With reference to FIGS. 11 and 12, the third embodiment of the invention will be described. In the drawings and the following description, the elements similar to those of the first embodiment are indicated by the same reference numbers.

A rotational power transmission device according to the third embodiment is substantially the same as in the first embodiment, except that, in the third embodiment, the connection members 7 are mounted to the second hub 11 while they are mounted to the rotor 4 in the first embodiment. In the third embodiment, the holder members 13 are mounted to the end wall 4a by a suitable manner such as welding. The connection members 7 are mounted to the second hub 11 by connecting pins 6 fitted into through holes in the second hubs 11.

In the third embodiment, the rotation is transmitted from the holder members 13 to the connection members 7. Therefore, the distance L of the front openings 13c is longer than the diameter of the connection members 7, and the distance LL of the rear openings 13d is smaller than the diameter of the connection members 7.

The operational function of the rotation transmission device according to the third embodiment is substantially the same as in the first embodiment, except that in the third embodiment, the connection members 7 pass through the rear opening, that is the opening between the second ends of the first and second arm portions, to disconnect the engagement between the connection members and the holder members when a torque about the drive shaft 8 exceeds a predetermined level.

With reference to FIGS. 13 to 17, the fourth embodiment of the invention will be described. In the drawings and the following description, the elements similar to those of the first embodiment are indicated by the same reference numbers.

Figure 14:
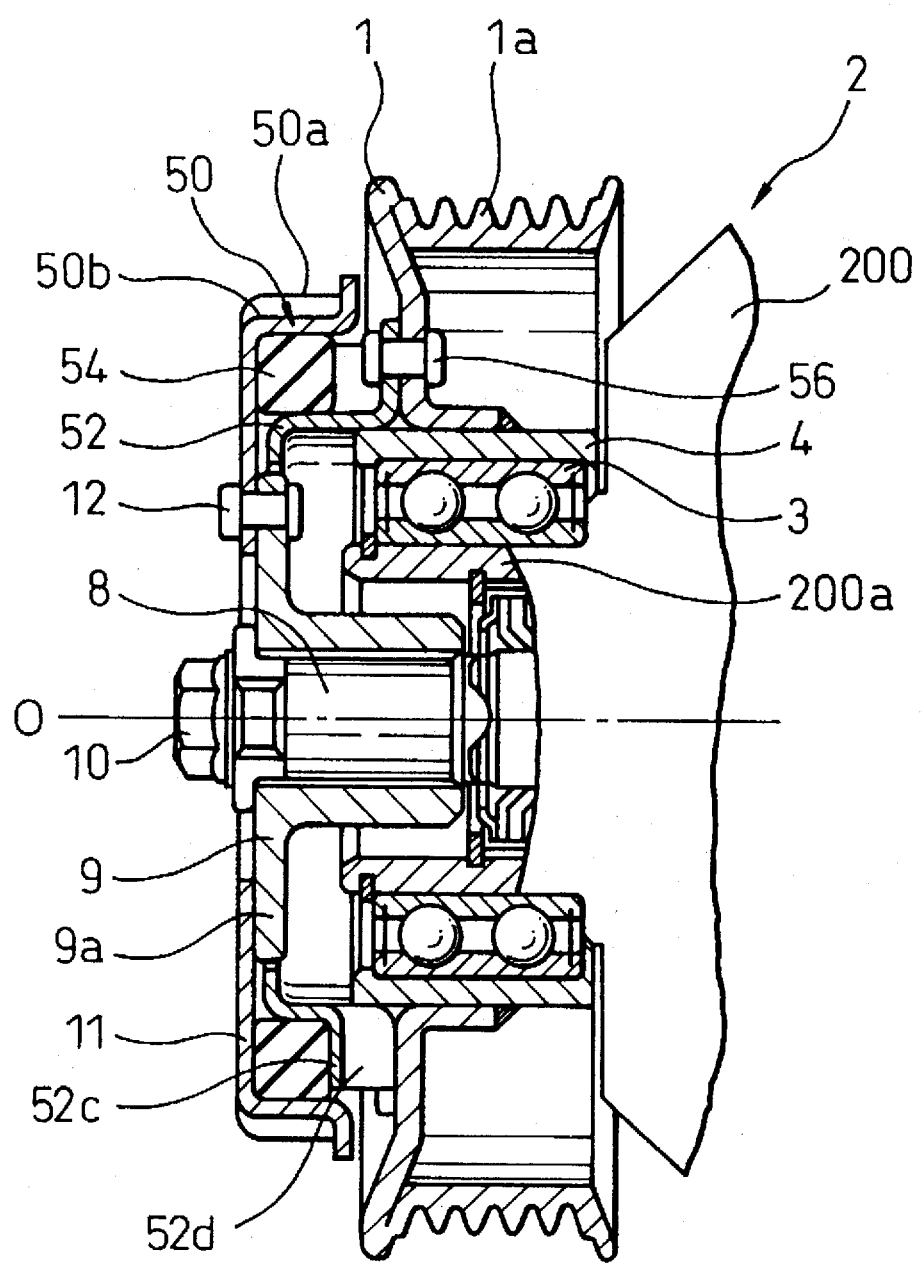
FIG. 14 is an illustration similar to FIG. 1 and is a partial section of a rotational power transmission device according to the fourth embodiment.
Figure 15:
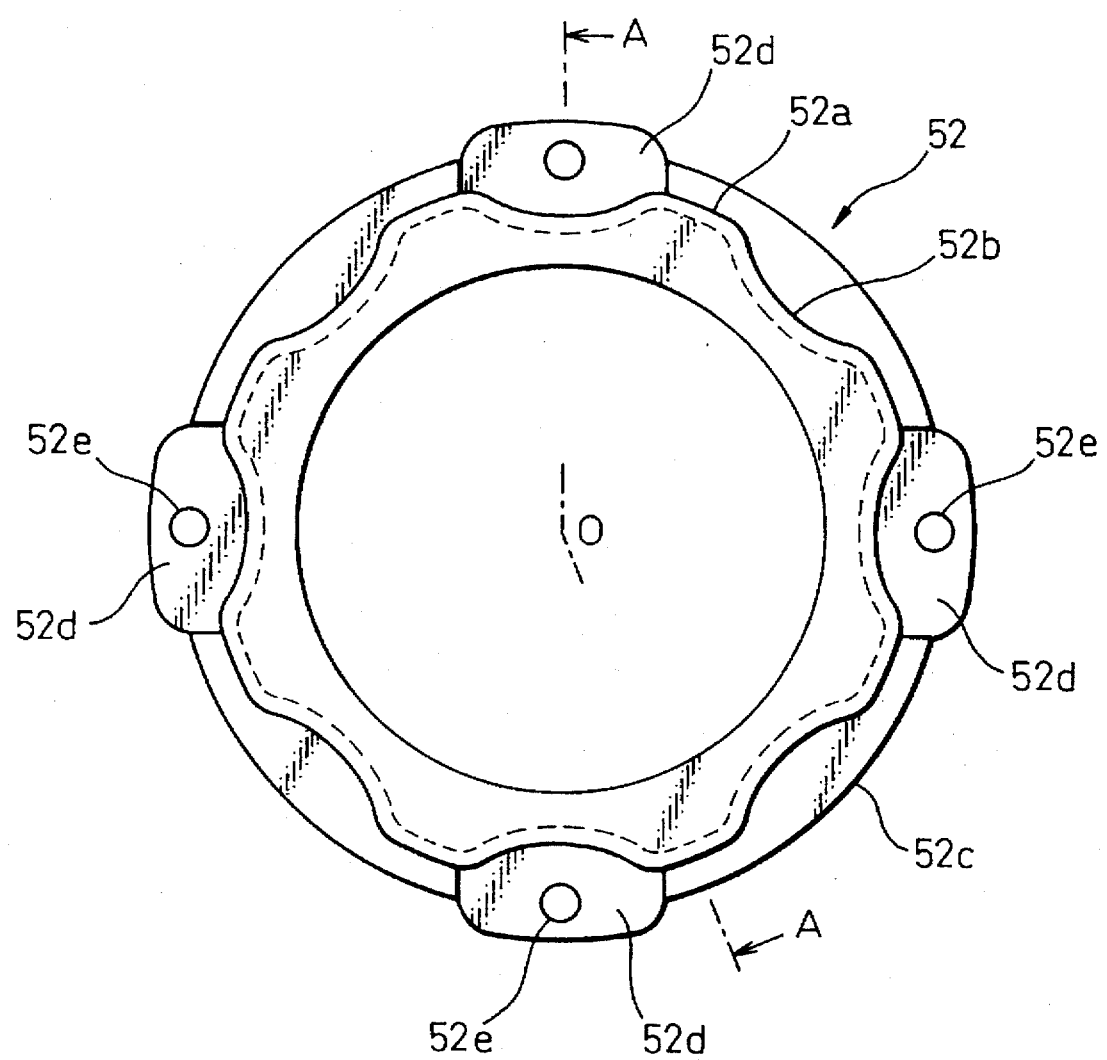
FIG. 15 is a front view of the second holder member according to the fourth embodiment.

In FIG. 14, the pulley 1 is secured to the rotor 4 by welding. The rotor 4 is formed into a ring shape while the rotor 4 is formed into a double-ring shape in the first embodiment (FIG. 1). The first hub 9 is connected to the drive shaft 8 through the spline connection. The second hub 11 is secured to the first hub 9 by rivets 12.

Figure 13:
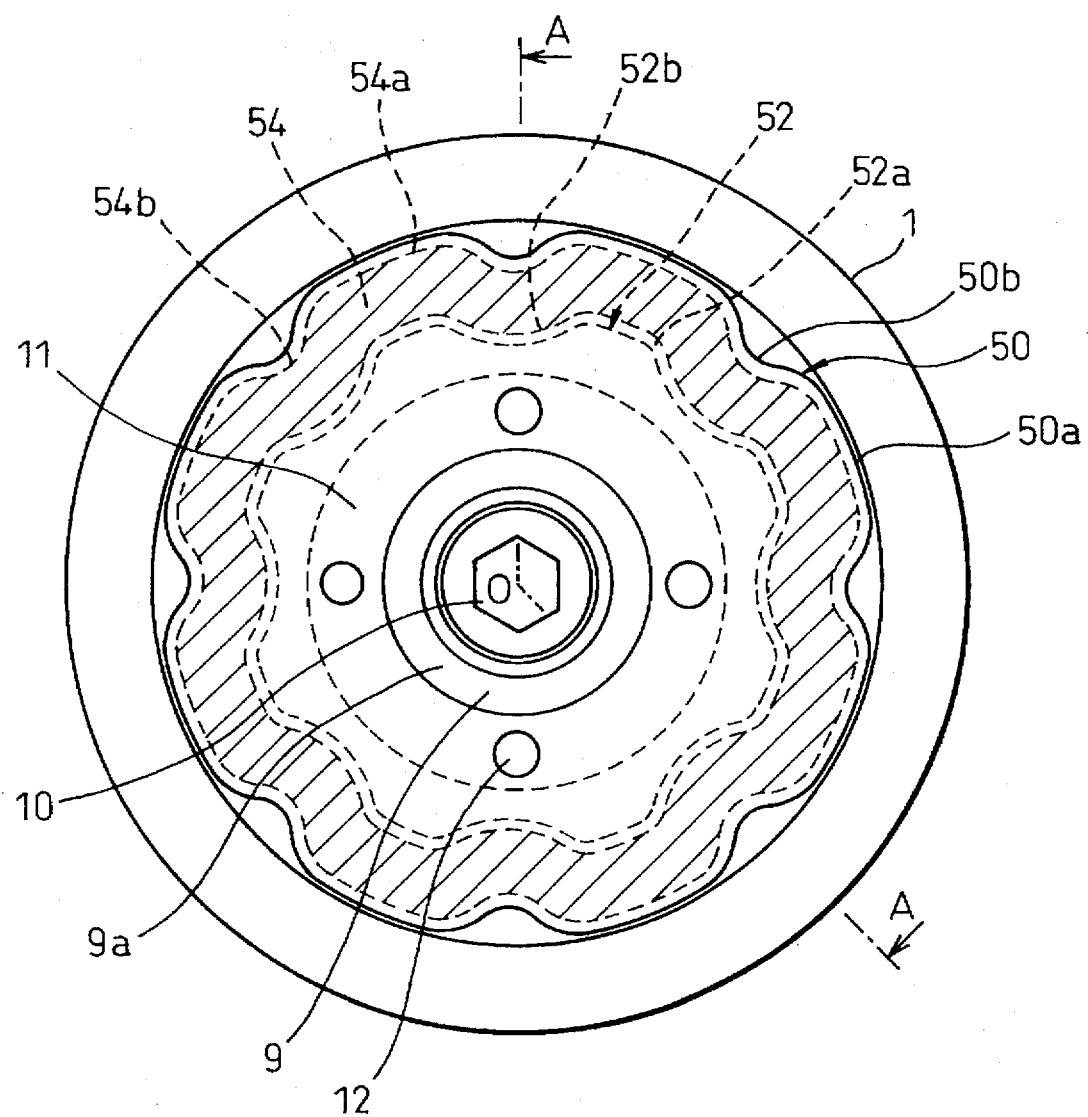
FIG. 13 is an illustration similar to FIG. 2 and is a front view a rotational power transmission device according to the fourth embodiment.

In this embodiment, the second hub 11 includes a cylindrical wall 50, which provides a first holder member, along the periphery (FIG. 14). The wall 50 includes a plurality of outwardly convex and concave portions 50a and 50b alternately arranged along the periphery of the second hub 11 (FIG. 13). The convex and concave portions provide an engagement force in the peripheral direction.

Figure 16:
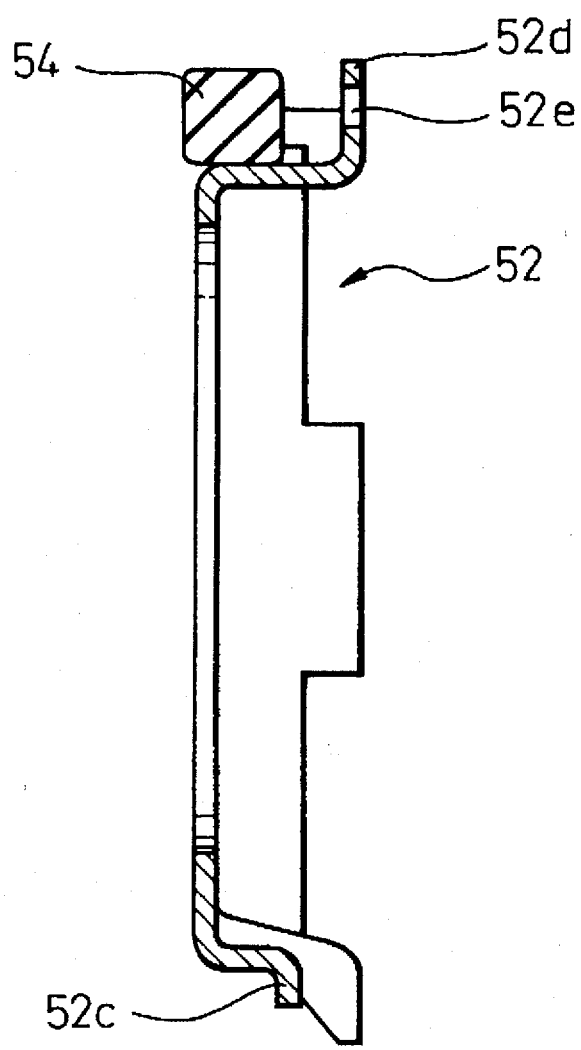
FIG. 16 is a side section of the second holder member of FIG. 15 along lines C-O-C.
Figure 17:
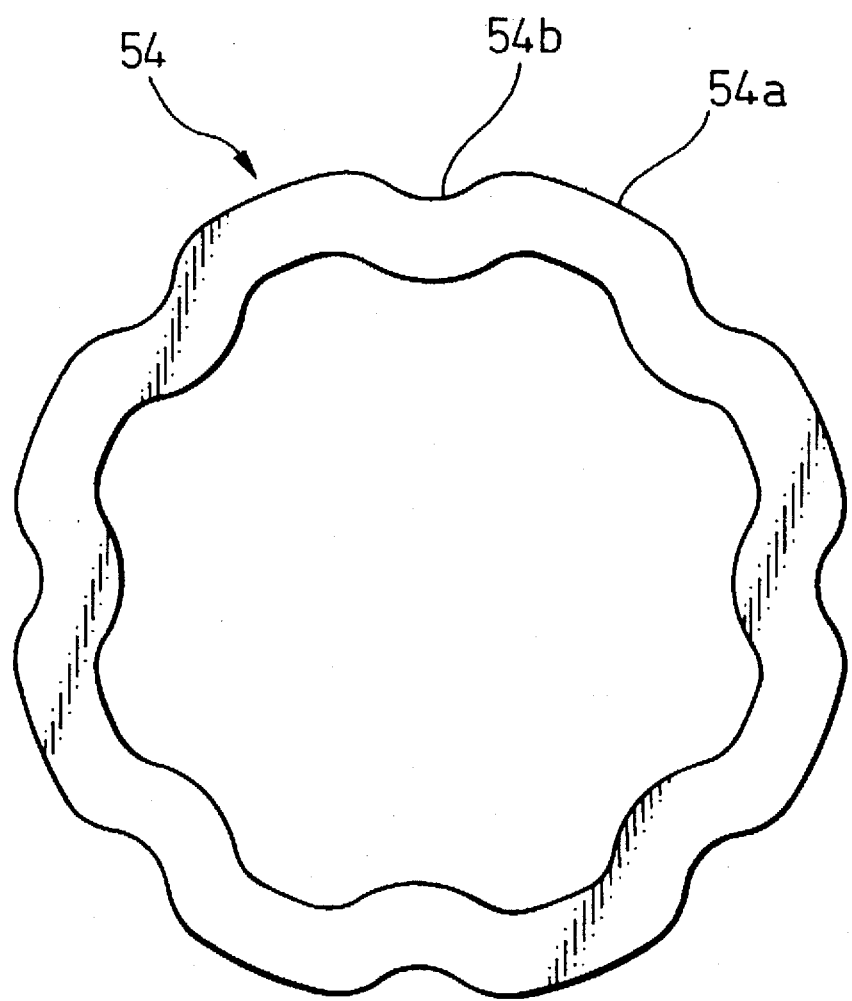
FIG. 17 is a front view of the elastic member according to the fourth embodiment.

A holder member 52, which provides a second holder member, substantially in the form of a ring is provided to hold an elastic connection member 54. The holder member 52 also includes a plurality of outwardly convex and concave portions 52a and 52b alternately arranged along its periphery. The holder member 52 further includes clamping portions 52c for holding the connection member 54 and flange portions 52d. As shown in FIG. 16, the clamping portions 52c substantially have an L shape section which includes an axial portion and radial portion. The flange portions 52d also substantially have an L shape section which includes an axial portion and radial portion. The axial portions of the flange portions 52d extend longer than those of the clamping portions 52c. The flange portions 52d include through holds 52e into which rivets 56 are fitted to mount the holder member 52 to the pulley 1 (FIG. 14).

The connection member 54 is substantially formed into a ring, which includes a plurality of outwardly convex and concave portions 54a and 54b alternately arranged along its periphery, and made of an elastic material, which can transfer a torque and absorb a variation on the torque, such as a rubber material, preferably, chlorinated butyl rubber, acrylonitrile-butadien rubber or ethylene-propylene rubber.

During assembly, the connection member 54 is clamped between the clamping portions 52c of the holder member 52 and the second hub 11 so that the outwardly convex and concave portions of the connection member 54 are mated to those of the wall 50 of the second hub 11 and of the holder member 52. The radial portions of the clamping portions 52c prevent the connection member 54 from moving in the axial direction. The difference, in the axial length, between the flange portions 52d and the clamping portions 52c of the holder member 52 allows the connection member 54 to be axially separate from the outer end face of the pulley 1, which reduces the contamination on the connection member 54 due to the oil from the compressor 2.

The thickness of the connection member 54 is slightly larger that the distance between the second hub 11 and the clamping portions 52c of the holder member 52. Thus, the connection member 54 is pressed therebetween to ensure the engagement with the second hub 11 and the holder member 52 through the concave and convex portions. The positive engagement connects the holder member 52 to the second hub 11. Thus, the rotation is transmitted from the pulley 1 to the drive shaft 8 of the compressor 2 through the holder member 52, the connection member 54, second hub 11 and the first hub 9.

The operational function of the fourth embodiment will be described.

The rotation of the crank pulley 14 (FIG. 3) of the automobile engine is transmitted to the pulley 1 through the belts 15 (FIG. 3). The second hub 11 is rotated through the positive engagement between the connection member 54 and the holder members 52, and the connection member 54 and the wall 50 of the second hub 11. Thus, the drive shaft 8 of the compressor 2 is rotated by the rotating pulley 1 through the holder member 52, the connection member 54 and the wall 50 of the second hub 11.

During the normal operation of the compressor 2, a torque, in general about 20 Nm, about the drive shaft 8 is applied to the connection member 52 as the same in the first embodiment. The elastic connection member 54 can absorb a fluctuation in the torque (refer to FIG. 9). When the drive shaft 8 is locked due to the failure of the compressor 2 such as seizing, the elastic connection member 54 deforms to disconnect the positive engagement by the convex and concave portions of the connection member 54, of the holder member 52 and the wall 50 of the second hub 11.

However, the rotation of the pulley 1 does not stop which results in the connection member 54 engaging again. When the failure is slight and the drive shaft 8 is locked temporarily, the engaged connection member 54 can transmit the rotation to the drive shaft 208. Thus, the compressor 2 can operate again automatically. When a significant failure occurs in the compressor 2 and the drive shaft 8 is permanently locked, the wear and tear on the connection members 7 completely separates the drive shaft 8 from the pulley 1.

Figure 18:
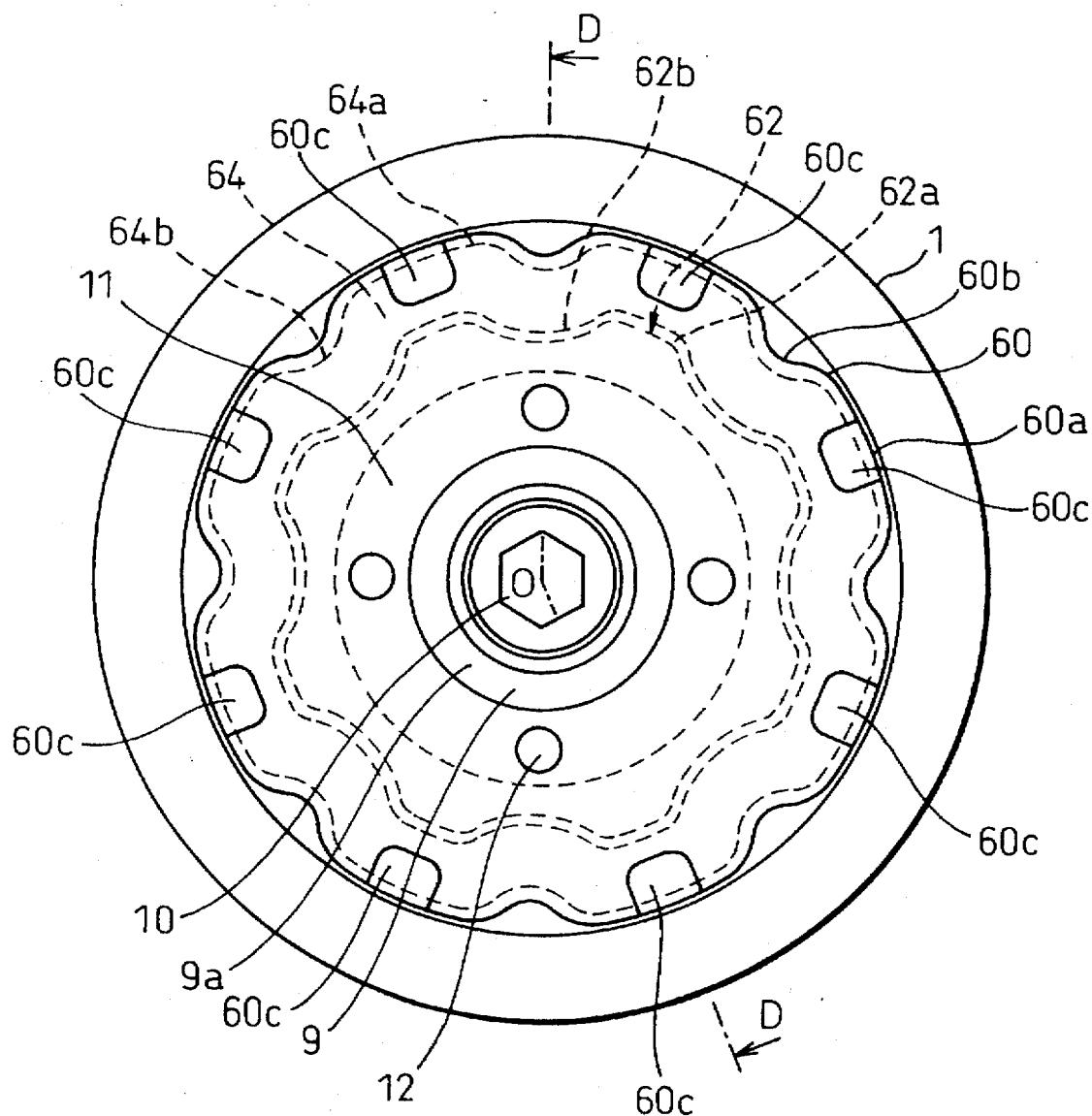
FIG. 18 is an illustration similar to FIG. 2 and is a front vies a rotational power transmission device according to the fifth embodiment.
Figure 19:
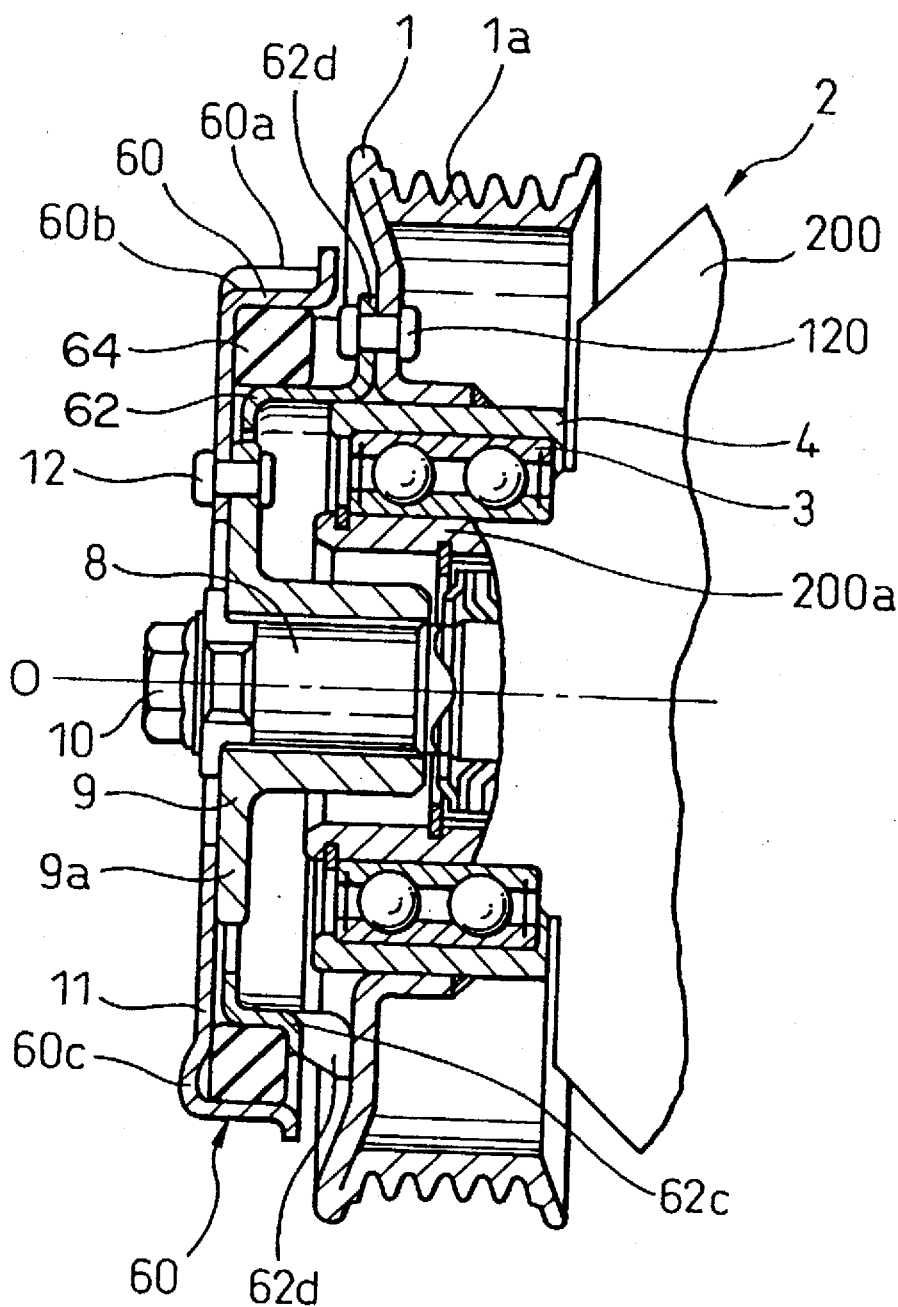
FIG. 19 is an illustration similar to FIG. 1 and is a section of a rotational power transmission device according to the fifth embodiment.

With reference to FIGS. 18 and 19, the fifth embodiment of the invention will be described. In the drawing and the following description, the elements similar to those of the first embodiment are indicated by the same reference numbers.

A rotational power transmission device according to the fifth embodiment is substantially the same as in the fourth embodiment, except that, in the fifth embodiment, the second hub 11 includes a plurality of recessed portions 60a.

In this embodiment, the second hub 11 includes a cylindrical wall 60 which extends along the periphery. The wall 60 includes a plurality of outwardly convex and concave portions 60a and 60b alternatively arranged along the periphery of the second hub 11 as in the fourth embodiment.

A holder member 62, substantially in the form of a ring, is provided to hold an elastic connection member 64. The holder member 62 also includes a plurality of outwardly convex and concave portions 62a and 62b alternately arranged which are the same as in the fourth embodiment. The holder member 62 further includes clamping portions 62c for holding the connection member 64 and flange portions 62d.

The connection member 64 is substantially the same as in the fourth embodiment. That is, the connection member 64 is substantially formed into a ring, which includes a plurality of outwardly convex and concave portions 64a and 64b alternately arranged along its periphery, and made of an elastic material, which can transfer a torque and absorb a variation in the torque, such as a rubber material, preferably, chlorinated butyl rubber, acrylonitrile-butadien rubber or ethylene-propylene rubber.

During assembly, the connection member 64 is clamped between the holder member 62 and the second hub 11 so that the outwardly convex and concave portions of the connection member 64 are mated to those of the wall 60 of the second hub 11 and of the holder member 62. The radial portions of the clamping portions 62c prevent the connection member 64 from moving in the axial direction. The difference of the axial length between the flange portions 62d and the clamping portions 62c of the holder member 62 allows the connection member 64 to be axially separate from the outer end face of the pulley 1, which reduces the contamination on the connection member 64 due to the oil from the compressor 2.

The thickness of the connection member 64 is slightly larger that the distance between the second hub 11 and the clamping portions 62c of the holder member 62. Thus, the connection member 64 is pressed therebetween to ensure the engagement with the second hub 11 and the holder member 62 through the concave and convex portions. The positive engagement connects the holder member 62 to the second hub 11. Thus, the rotation is transmitted from the pulley 1 to the drive shaft 8 of the compressor 2 through the holder member 62, the connection member 64, second hub 11 and the first hub 9.

The second hub 11 includes the recessed portions 60c which protrude outwardly in the axial direction. Portions of the elastic connection member 64 enter the recessed portions 60c when the connection member 64 deforms during assembling.

The elastic connection member 64 deforms during assembling due to the fastening of the bolt 10. The bolt 10 is fastened to compensate the dimensional tolerance. If the bolt 10 is excessively fastened, the elastic connection member 64 deforms so that the elasticity thereof is reduced and the connection member 64 can not absorb a fluctuation in the torque or cannot disconnect the engagement. In this embodiment, the portions of the deformed connection member 64 enter the recesses 60c to maintain the required elasticity.

Figure 20:
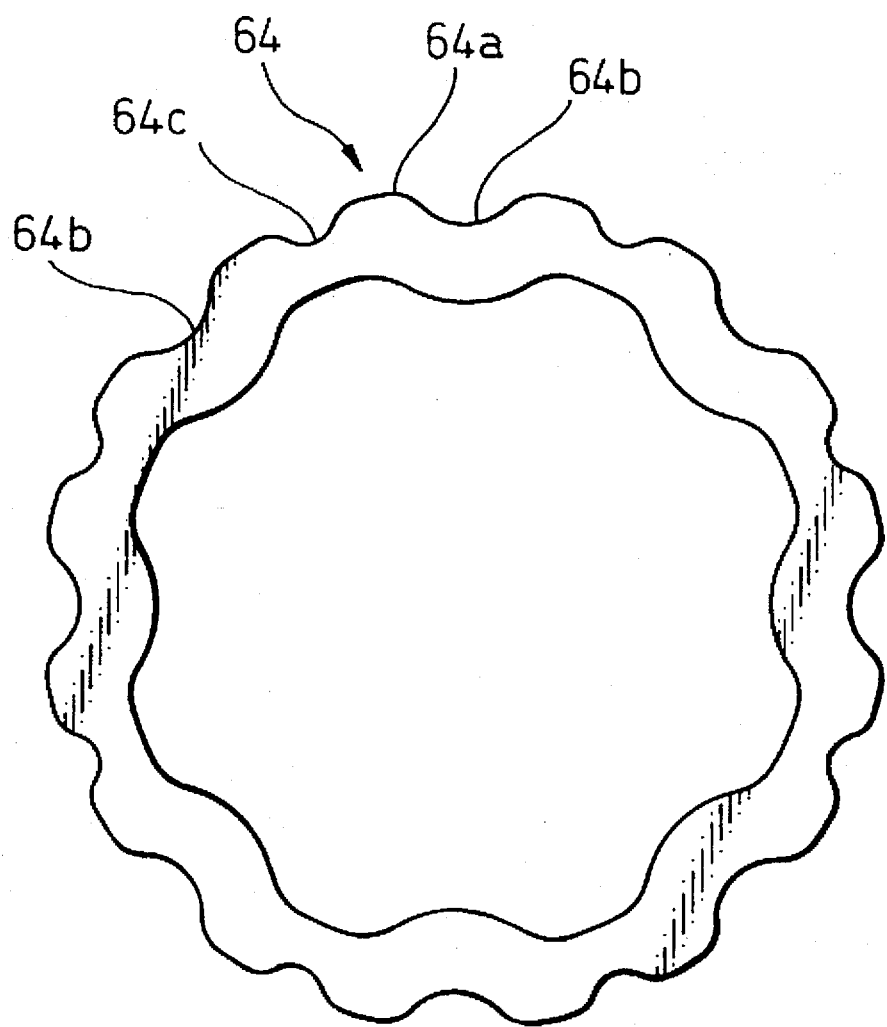
FIG. 20 is a front view of the elastic member according to the sixth embodiment.

With reference to FIG. 20, the sixth embodiment of the invention will be described. In the drawing and the following description, the elements similar to those of the first embodiment are indicated by the same reference numbers.

A rotational power transmission device according to the sixth embodiment is substantially the same as in the fifth embodiment, except that, in the sixth embodiment, the connection member 64 includes a plurality of bent portions 64c in the outwardly convex portions 64a. The bent portions 64c facilitate the elastic deformation of the connection member 64. The dimension and shape of the bent portions 64c are selected to obtain the desired torque which disconnects the positive engagement between the connection member 64 and the wall 60 of the second hub 11, and between the connection member 64 and the holder member 62.

In the fourth to sixth embodiments, the convex and concave portions are provided on the wall 60 of the second hub 11 and the holder member. However, the convex and concave portions can be provided on either the wall 60 of the second hub 11 or the holder member. In this case, the connection member 64 is fixed to the one which has no convex and concave portions by a suitable manner such as adhesive.

Figure 21:
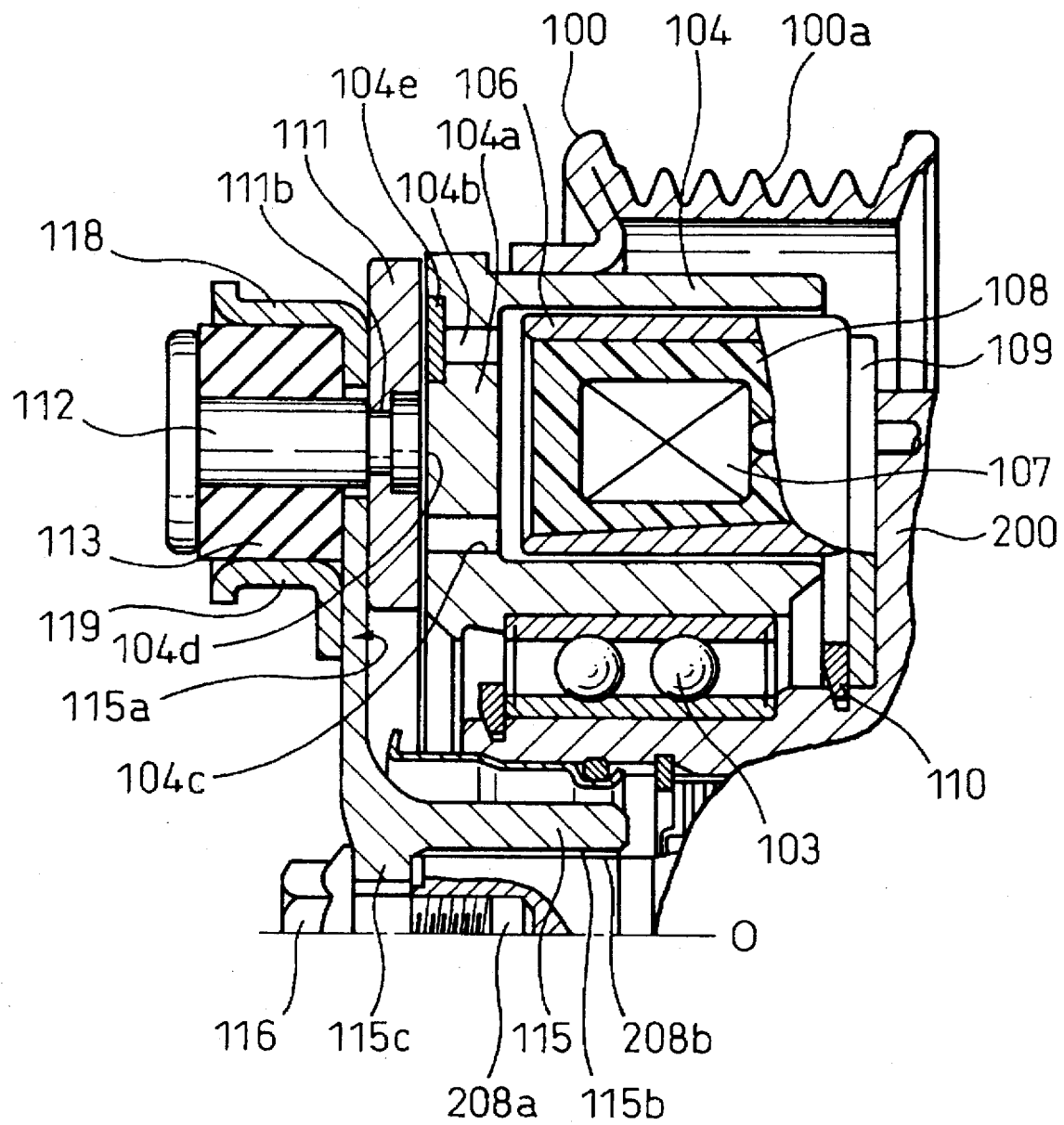
FIG. 21 is an illustration similar to FIG. 1 and is a partial section of a rotational power transmission device with an electro-magnetic clutch according to the seventh embodiment.
Figure 22:
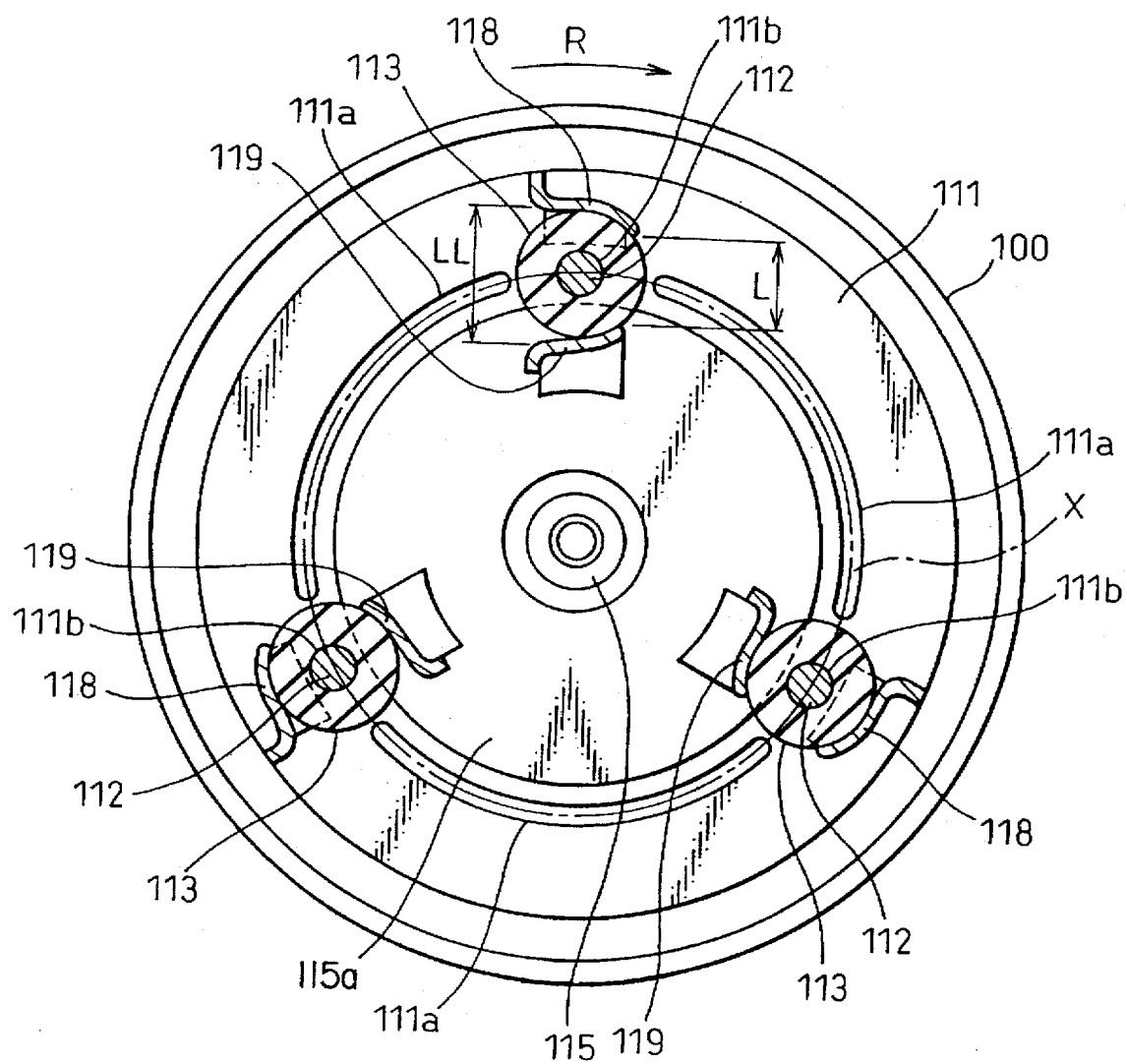
FIG. 22 is an illustration similar to FIG. 2 and is a front view a rotational power transmission device with an electro-magnetic clutch according to the seventh embodiment.

With reference to FIGS. 21 and 22, a rotational power transmission device according to the seventh embodiment of the invention is illustrated. The rotational power transmission device comprises a pulley 100 for receiving driving power from the rotational power source, for example, an automobile engine (not shown). That is, the pulley 100 has rim 100a with V-shaped grooves directed to engage V-shaped belts 15 (see FIG. 3). The belts 15 extend from the crank pulley 14 via the water pump pulley 16, the alternator pulley 17, the hydraulic pump pulley 18 and the pulley 100 as in the forgoing embodiments.

The pulley 100 is connected to a rotor 104 by an appropriate connecting method such as welding. the rotor 104 is formed into a double-ring shape and includes an end wall 104a which connects the outer ring and inner ring to each other. The rotor 104 is rotationally mounted to a cylindrical support 200a of the compressor 2 through a bearing 103. In this embodiment, the compressor 2 is a variable displacement type compressor which is described in the forgoing embodiment and shown in FIG. 4. However, the compressor 2 can be a non-variable displacement type such as a vane type or scroll type compressor.

A magnetic pole member 106 in the form of a double-ring shape is provided between the outer and inner ring of the rotor 104. The magnetic pole member 106 is made of ferric material, preferably a ferromagnetic material. An electromagnetic coil 107 is provided in the magnetic pole member 106. The coil 107 is electrically insulated from the magnetic pole member 106 and is mounted to the magnetic pole member 106 by an insulation 108 made of a resin material. The magnetic pole member 106 is fixedly mounted to the front housing 202 of the compressor 2 by a stay 109 and a snap ring 110. The end plate 104a of the rotor 104 includes concentric arc slots 104b and 104c for magnetic shielding.

The rotational power transmission device further comprises an armature 111 in the form of a ring. The armature 111 is arranged to face to the end wall 104a of the rotor 104. The outer end face of the end wall 104a defines a friction surface. The armature is made of ferric material, preferably a ferromagnetic material. The armature 111 can move in the axial direction between a connecting position where the surfaces of the end wall 104a and the armature 111 engage with each other, and a disconnecting position where the surfaces are separated from each other. In particular, the armature 111 moves to the connecting position when the coil 107 is energized to generate attractive force on the armature 111, and to the disconnecting position when the coil 107 is deenergized. Further, friction members 104e are provided along the outer arc slots 104b to increase the friction force and the torque transmitted.

The armature 111 includes a plurality of arc slots 111a, in this embodiment three slots (FIG. 22), which extend along a circle X about the axis O of the drive shaft 8, for magnetic shielding. A plurality of pins 112 (in this embodiment three pins) are provided on the outer surface of the armature 111 between the slots. The pins 112 are fitted into bores 111b in the armature 111. Cylindrical connection members 113 are mounted to the armature 111 by fitting onto the pins 112. The pins 112 and the connection members 113 are equally spaced along the circle X about the axis O.

The connection members 113 are made of an elastic material, which can transfer a torque and absorb a variation on the torque, such as a rubber material, preferably, chlorinated butyl rubber, acrylonitrile-butadien rubber or ethylene-propylene rubber as in the first embodiment.

A hub 115, substantially in the form of a cylindrical member, with a flange portion 115a is connected to the drive shaft 8 of the compressor 2. The hub 115 includes a spline portion 115b on the inner surface which engages the mating spline 208b on the drive shaft 8 of the compressor 2, and an peripheral abutting portion 115c which extends along the inner surface of the hub 115. The inner end face of the abutting portion 115c abuts the end face of the drive shaft 208a through a shim therebetween to adjust the axial position of the hub 115. The hub 115 is mounted to the drive shaft 8 by a bolt 116 which is fastened to a threaded hole 208a in the drive shaft 8. Thus, the hub 115 rotates with the drive shaft 8.

First holder members 118 are provided on the outer surface of the armature 111. Second holder members 119 are provided on outer surface of the flange portion 115a of the hub 115. The first and second holder members 118 and 119 are mounted to the respective surfaces by a suitable manner such as welding. The first and second holder members 118 and 119 comprise first and second arm portions. The first and second holder members 118 and 119 extend substantially circumferentially. The holder members are made of a suitable ferric metallic material such as cold rolled steel SPCC.

The first holder members 118 have first ends toward the rotational direction R and second opposite ends. The first holder members are equally spaced along a circle about the axis to hold the cylindrical connection members 113 from the radially outside thereof. The second holder members 119 have first ends toward the rotational direction R and second opposite ends. The second holder members 119 are arranged along a circle about the axis to hold the elastic portions from the radially inside thereof. Further, the second holder members 119 are radially aligned to the respective first holder members 118 to positively engage the respective connection members with the first holder members 118. The first and second ends of the first and second holder members 118 and 119 define front and rear openings 120 and 122 therebetween.

The distance L of the front opening 120 is smaller than the diameter of the connection members 113 to hold the connection members 113 and to obtain a positive engagement between the connection members 113 and the holder members 118 and 119 during the normal rotation. Thus, the armature 111 and the hub 115 are connected by the holder members 118 and 119 holding the connecting members 113 when the armature rotates in the normal direction. Further, the pulley 100 is connected to the hub 115 when the coil 107 is energized and the armature 111 engages the outer surface of the end wall 104a.

On the other hand, the distance LL of the rear openings 122 is longer than the diameter of the connection members 113 so that the connection members 113 released from the holder members 118 and 119 can enter the holder members again during the normal rotation.

The functional operation of the seventh embodiment will be described.

When the compressor 2 is started, the coil 107 is energized to generate attractive force on the armature 111. The armature 111 moves to the connecting position to engage the outer surface of the end wall 104a. At the time, the armature 111 applies a force against the magnetic force due to the engagement between the first holder members 118 and the connection members 113. The electromagnet must generate a magnetic force which will allow the armature to move against the force due to the engagement between the holder members and the connection members.

The rotation of the crank pulley 14 of the automobile engine is transmitted to the pulley 110 through the belts 15 (FIG. 3), which results in the rotation of the rotor 104. The hub 115 is rotated through the positive engagement between the connection members 113 and the holder members 118 and 119. Thus, the drive shaft 8 of the compressor 2 is rotated by the rotating pulley 1 through the engagement between the outer surface of the end wall 104a of the rotor 104, and the positive engagement between the connection members 113 and the holder members 118 and 119.

Figure 23:
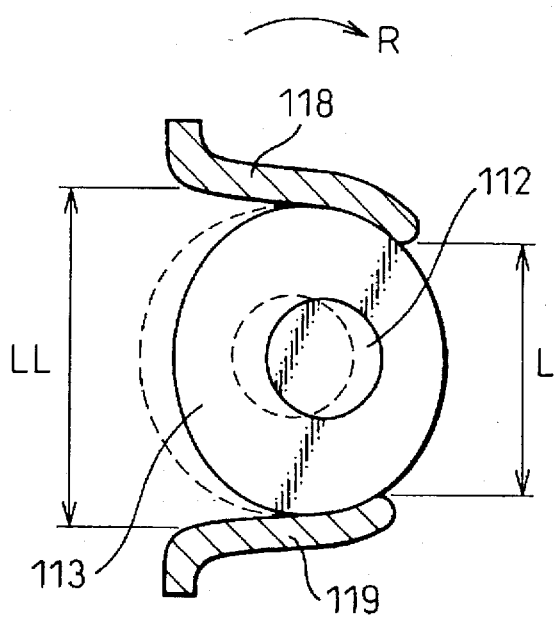
FIG. 23 is an enlarged illustration, similar to FIG. 6, of the elastic member and the holder member according to the seventh embodiment of the invention.

During the normal operation of the compressor 2, a torque, in general about 20 Nm, about the drive shaft 8 is applied to the connection members 113. The torque on the connecting members 113 deforms them as shown in FIG. 23. In FIG. 23, the shape of the connection members 113 on which no torque is applied is shown by a broken line. However, the deformation of the connection members 113 cannot disconnect the connection members 113 and the holder members 118 and 119. In other word, the dimension L of the front openings 120 is selected so that the holder members 118 and 119 do not release the connection members 113 due to the deformation. Therefore, the deformation does not impair the transmission of the rotation from the pulley 1 to the drive shaft 8.

Further, the elastic connection members 113 can absorb a fluctuation in the torque as in the first embodiment.

Figure 24:
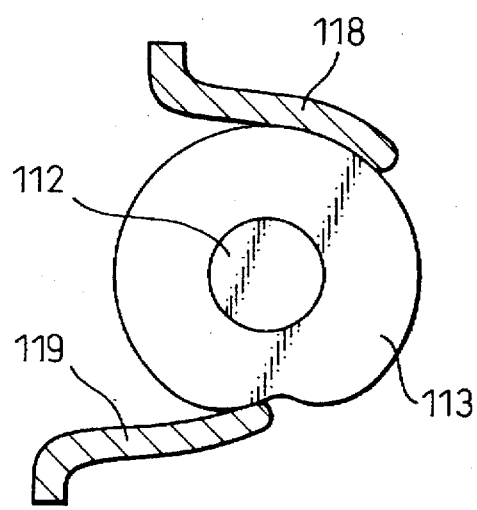
FIG. 24 is an illustration similar to FIG. 23 in which the first holder member and the elastic member rotate relative to the second holder member, and the elastic member is deformed.
Figure 25:
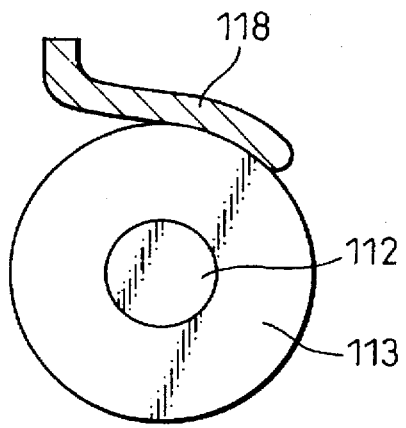
FIG. 25 is an illustration similar to FIG. 23 in which the first holder member and the elastic member rotate to be disengaged from the second holder member.

When the drive shaft 8 is locked due to the failure of the compressor 2 such as seizing, the connection members 113 and the first holder members 118, both of which are mounted on the armature 111, rotate relative to the second holder members 119 on the hub 115 with the connection members 113 deforming as shown in FIG. 24. Finally, as shown in FIG. 25, the connection members 113 are released from the second holder members 119 to disconnect the positive engagement between the connection members 113 and the holder members 118 and 119. The wear and tear on the connection member 113 is reduced compared with the first through third embodiment since the first holder members 118 move with the connection members 113 in the rotational direction.

However, the rotation of the pulley 1 does not stop which results in the connection members 113 and the first holder members 118 rotating. The connection members 113 and the first holder members 118 meet the next second holder members 119, and the holder members 118 and 119 hold the connection members 113 again. The dimension LL of the rear openings 122 allows the connection members 113 to enter between the holder members 118 and 119.

When the failure is slight and the drive shaft 208 is locked temporarily, the held connection members 113 can transmit the rotation to the drive shaft 8 again. Thus, the compressor 2 can operate again automatically. When a significant failure occurs in the compressor 2 and the drive shaft 8 is permanently locked, the hold and release of the connection members 113 are repeated to separate the drive shaft 8 from the pulley 1. Thus, the failure on the belts 15 or the other devices for the automobile engine is prevented.

Figure 26:
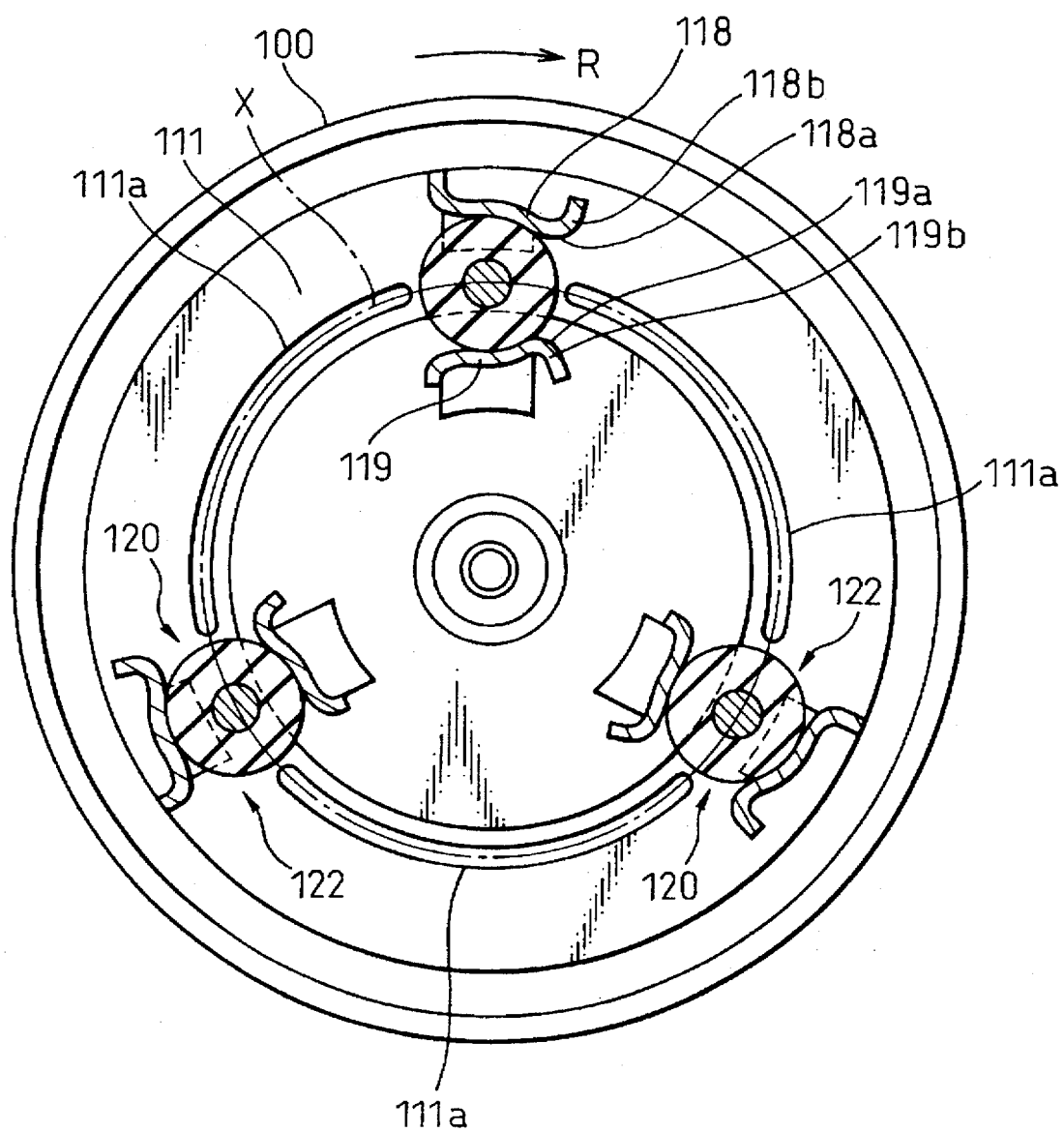
FIG. 26 is an illustration similar to FIG. 2 and is a front view a rotational power transmission device with an electro-magnetic clutch according to the eighth embodiment.

With reference to FIG. 26, the eighth embodiment of the invention will be described. In the drawing and the following description, the elements similar to those of the seventh embodiment are indicated by the same reference numbers.

A rotational power transmission device according to the eighth embodiment is substantially the same as in the seventh embodiment, except that, in the eighth embodiment, the holder members 118 and 119 include extension portions 118b and 119b which are connected to the first ends of the first and second holder members 118. Rounded corners 118a and 119a are made between the first ends and the extension portions 118b and 119b. The rounded corners 118a and 119a facilitate the exit of the elastic connection members 113 from the holder members 118 and 119 through the front openings 120. Thus, the wear and tear on the connection members 113 are further reduced. Preferably, the extension portions 118b and 119b are not connected to the second hub 11 to be compliant when the connection members 7 pass through the front openings 120.

The functional operation of the rotation transmission device according to the second embodiment is substantially the same as in the seventh embodiment.

Figure 27:
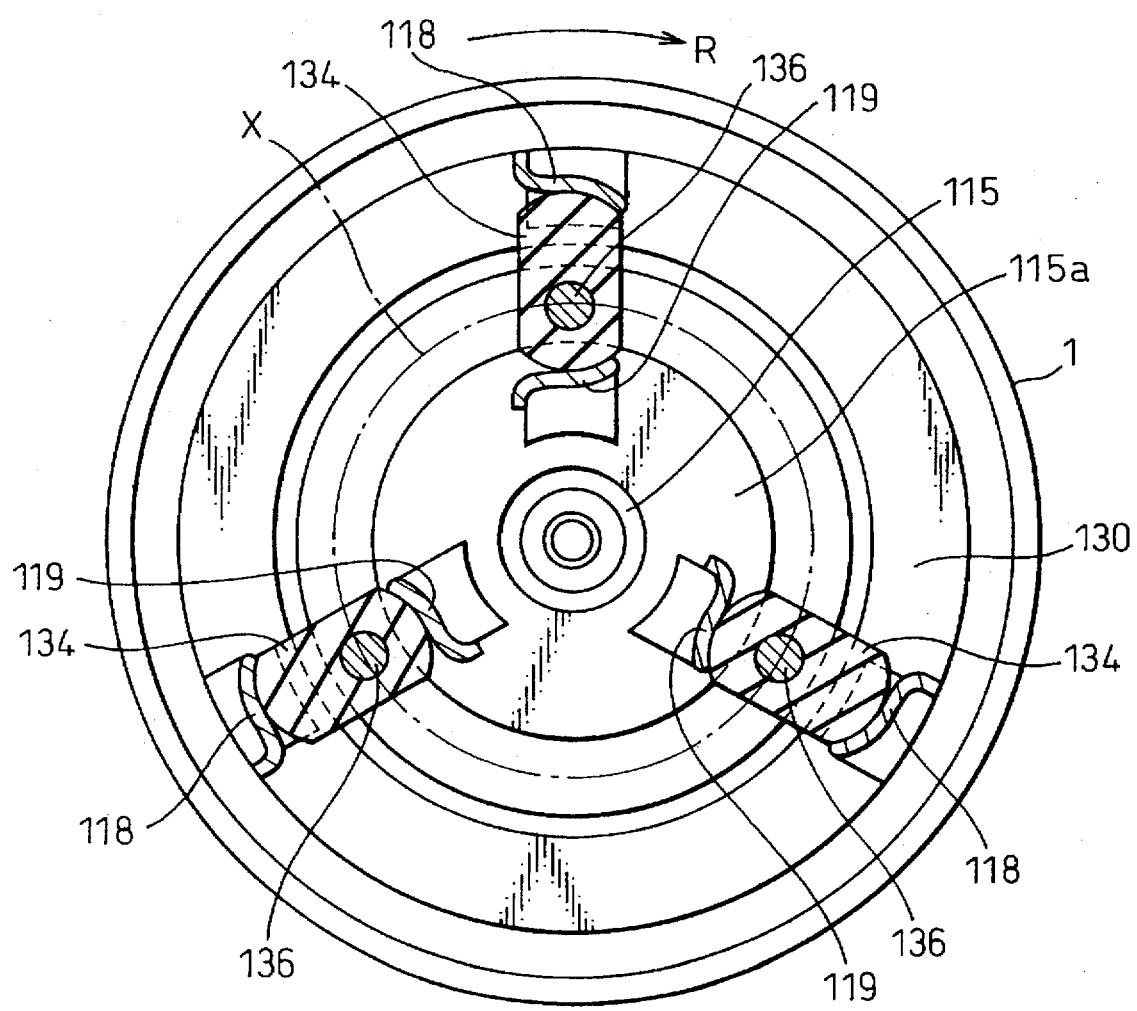
FIG. 27 is an illustration similar to FIG. 2 and is a front view a rotational power transmission device with an electro-magnetic clutch according to the ninth embodiment.
Figure 28:
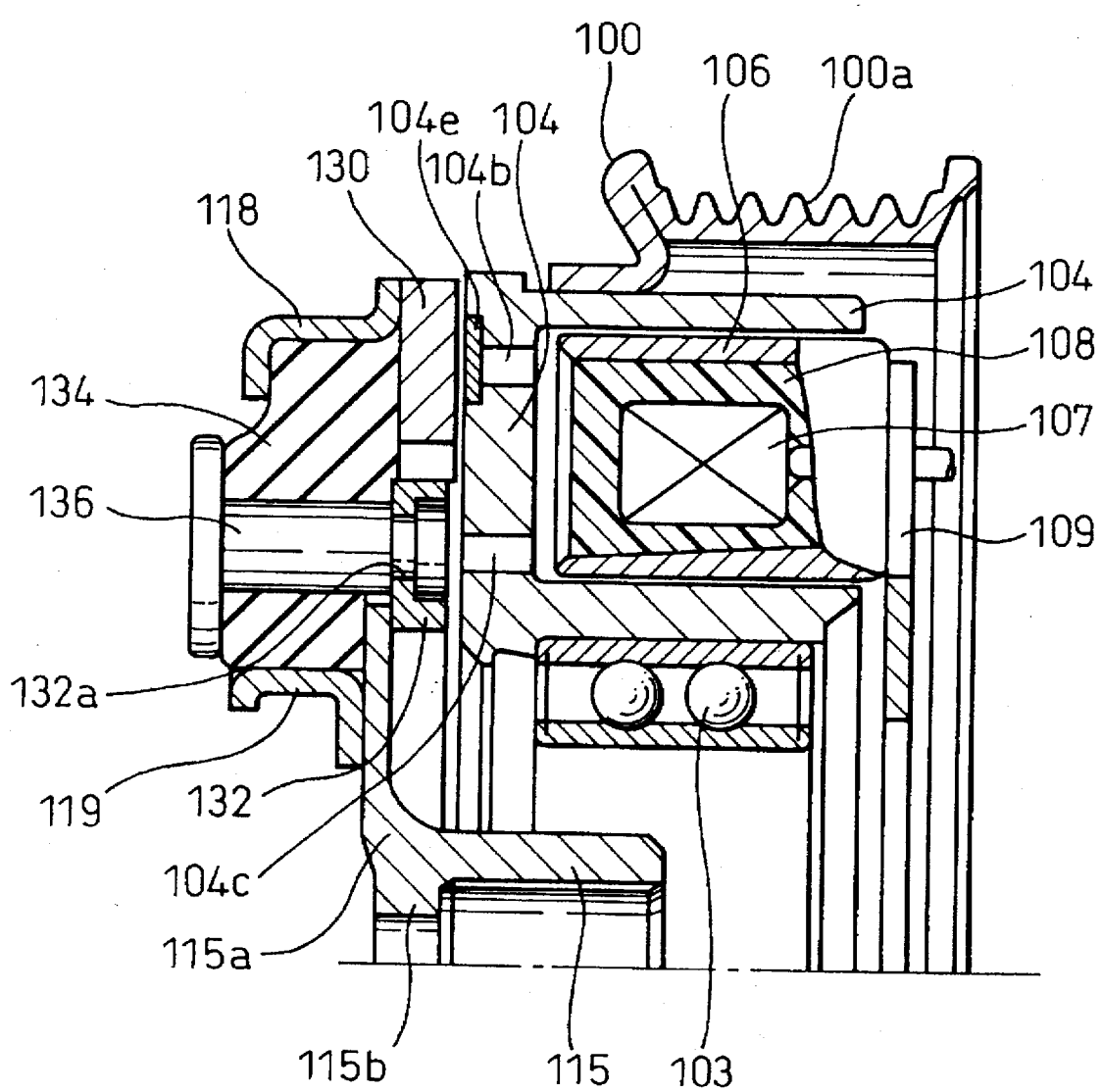
FIG. 28 is an illustration similar to FIG. 1 and is a partial section of a rotational power transmission device with an electro-magnetic clutch according to the ninth embodiment.
Figure 29:
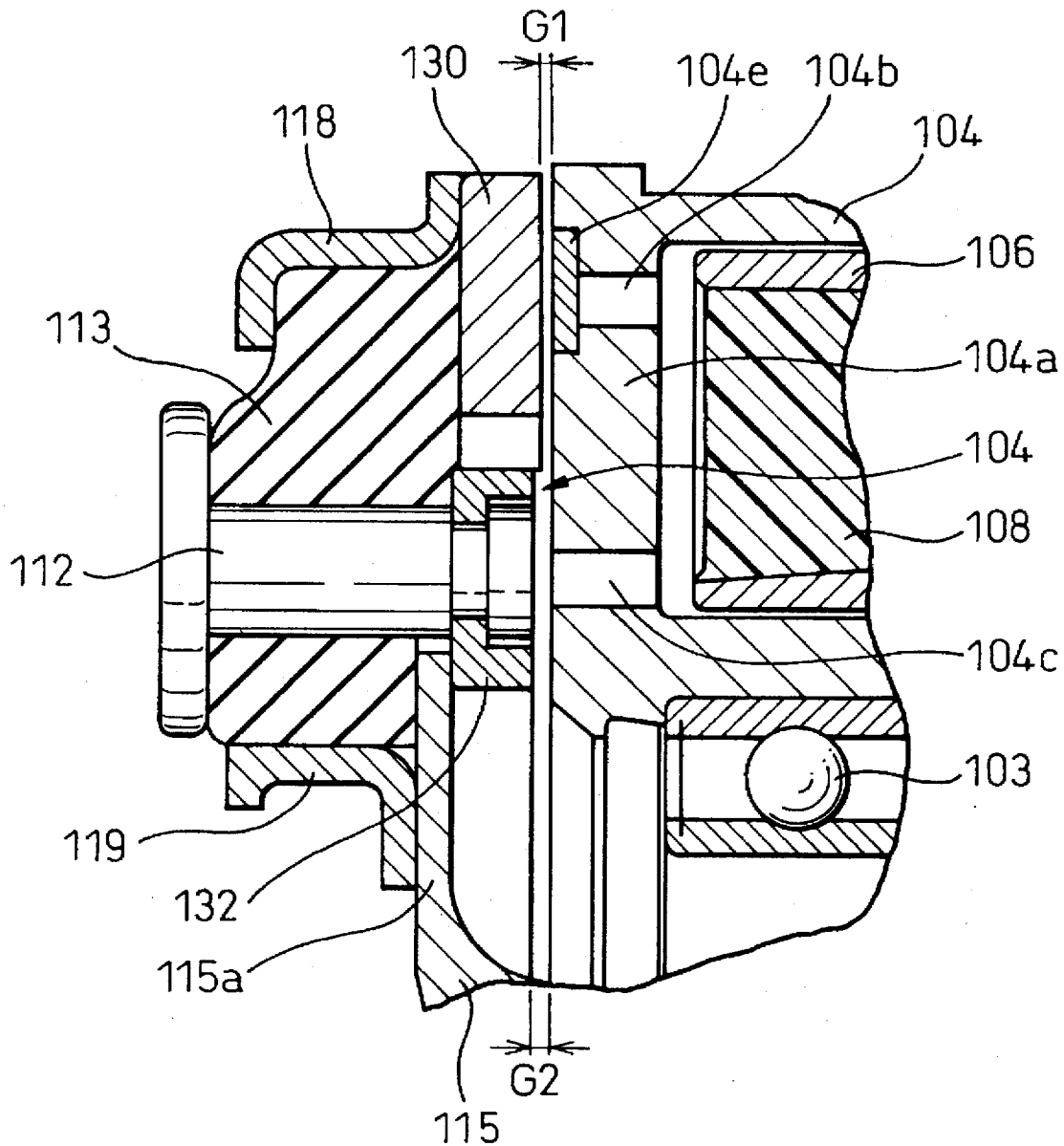
FIG. 29 is an enlarged section of a rotational power transmission device with an electro-magnetic clutch in FIG. 28.

With reference to FIGS. 27 and 29, the ninth embodiment of the invention will be described. In the drawings and the following description, the elements similar to those of the seventh embodiment are indicated by the same reference numbers.

A rotation transmission device according to the ninth embodiment is substantially the same as in the seventh embodiment, except that, in the ninth embodiment, the armature includes an outer armature ring 130 and an inner armature ring 132, and that the connection members 134 have an elongated configuration.

In the ninth embodiment, the first holder members 118 are mounted on the outer armature ring 130, and the second holder members 119 are mounted on the flange portion 115a of the hub 115. The connection members 134 are formed into an elongated shape which has a section with a rectangular portion and two half circular portions at the ends of the rectangular portion. The radially outer portions of the connection members 134 are clamped by the first holder members 118 and the outer armature ring 130. Pins 136 are fitted into bores 132a in the inner armature ring 132 to mount the connection member 134 to the inner armature ring 132. Thus, both the outer and inner armature rings 130 and 132 are connected to the connection members 134. The connection members 134 include first inner surfaces which the outer armature ring 130 contacts and second inner surfaces which the outer armature ring 132 contacts. The first and second inner surfaces are at different axial positions.

The gap G1 between the outer armature ring 130 and the outer surface of the end wall 104a is less than the gap G2 between the inner armature ring 132 and the outer surface of the end wall 104a. For example, the gap G1 may be 0.3 mm, and the gap G2 may be 0.5 mm. The difference of the axial positions of the first and second inner surfaces of the connection members 134 makes the different gaps G1 and G2. However, the gaps can be made so that the gap G2 is less that the gap G1.

When the coil 107 is energized, the outer and inner armature ring 130 and 132 move to the connecting position with the connection members 134 deforming. However, the outer ring armature ring 130 contacts the the outer surface of the end wall 104a to transmit the torque from the rotor 104 before the inner armature ring does since the gap G1 is less than the gap G2. Thus, the torque is transmitted by the two stages, which reduces the torque peak during the starting stage of the compressor 2.

For example, during the normal operation of the compressor 2, the torque on the drive shaft is about 20 Nm. However, in the prior art, the torque increases to 45 Nm at the starting stage of the compressor 2. The belts 15 on the pulley 100 would slip at the torque of 75 Nm. Therefore, in the prior art, the rotational power transmission device must be designed to disconnect the rotor from the drive shaft of the compressor within a torque range of 45–75 Nm. On the other hand, according to the ninth embodiment of the invention, the starting torque is reduced to about 30 Nm. Therefore, according to this embodiment, the operational torque range of the rotational power transmission device is increased to that of 30–75 Nm.

The other functional operation of this embodiment is substantially the same as in the seventh embodiment.

Figure 30:
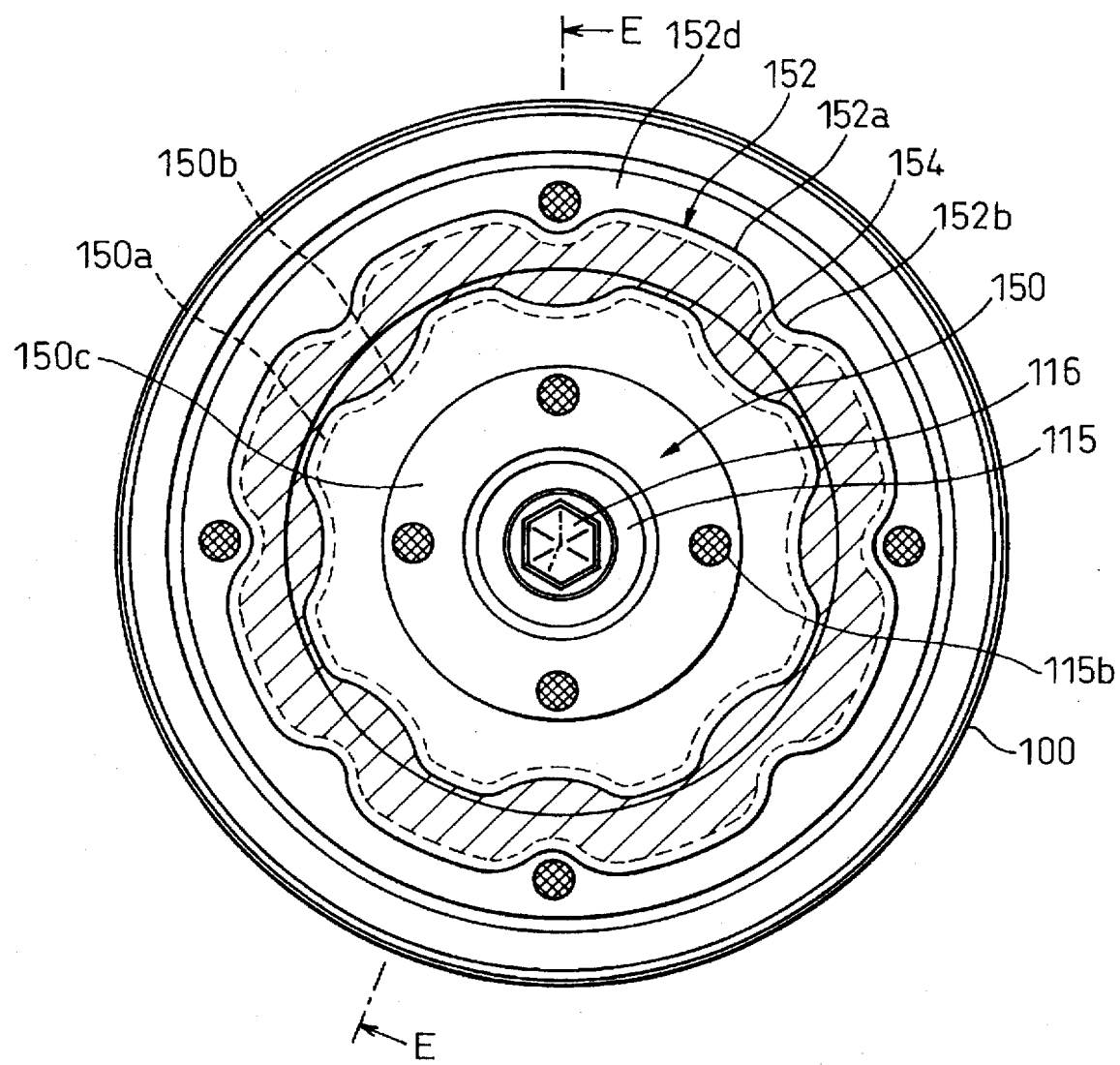
FIG. 30 is an illustration similar to FIG. 1 and is a partial section of a rotational power transmission device with an electro-magnetic clutch according to the tenth embodiment.
Figure 31:
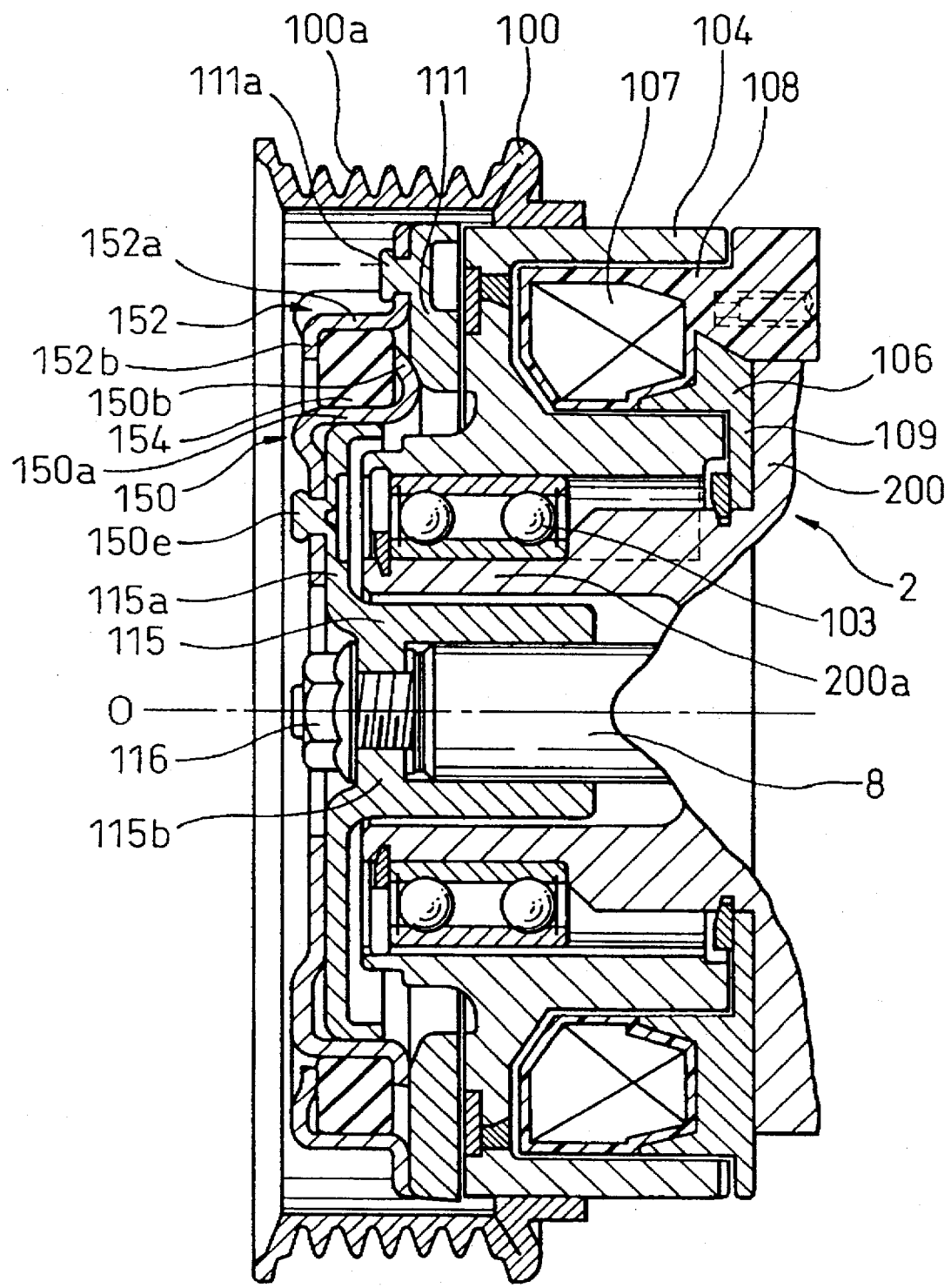
FIG. 31 is an illustration similar to FIG. 1 and is a partial section of a rotational power transmission device with an electro-magnetic clutch according to the tenth embodiment.
Figure 32:
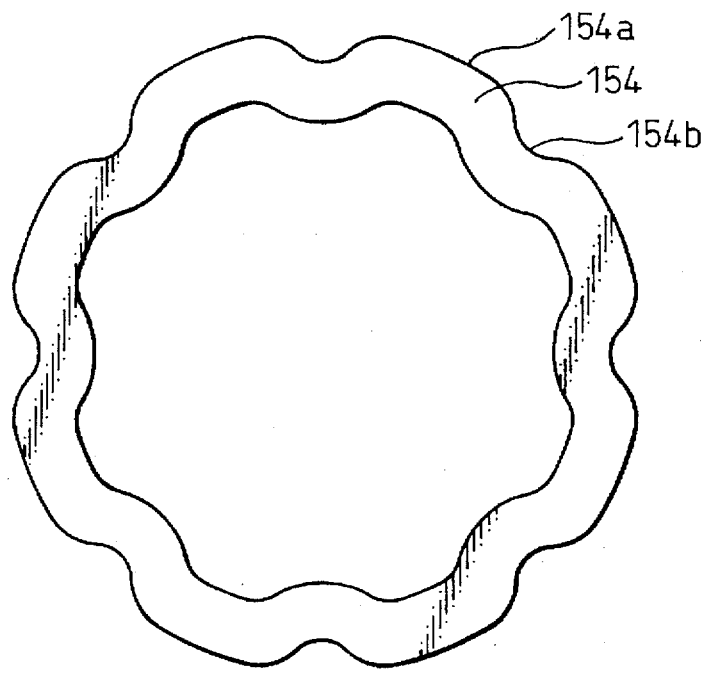
FIG. 32 is a front view of the elastic member according to the tenth embodiment.
Figure 33:
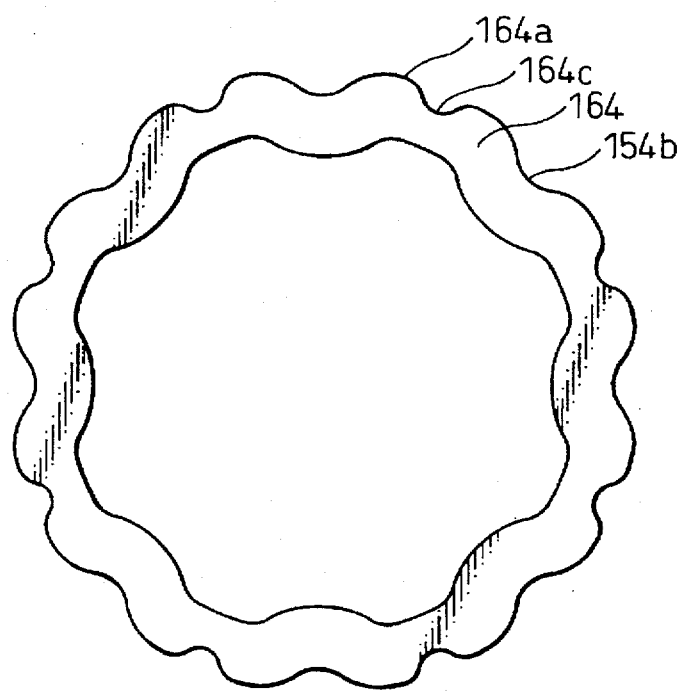
FIG. 33 is a front view of the elastic member according to the eleventh embodiment.

With reference to FIGS. 30 to 32, the tenth embodiment of the invention will be described. In the drawings and the following description, the elements similar to those of the seventh embodiment are indicated by the same reference numbers.

In FIG. 31, a second holder member 150 substantially in the form of a ring is concentrically mounted to the hub 115 by rivets 150e. The rivets 150e are formed integrally with the hub 115b. The second holder member 150 is made of a non-magnetic material such as an aluminum alloy. The second holder member 150 includes a wall portion 150a extending along the periphery and a clamping portion 150b extending radially outwardly from the end of the wall portion 150a. The wall portion 150a includes a plurality of outwardly convex and concave portions 150c and 150d alternatively arranged along the periphery of the second holder member 150 (FIG. 30).

A first holder member 152, substantially in the form of a ring, is mounted to the armature 111 by rivets 111a which are formed integrally with the armature 111. The first holder member 152 is made of a non-magnetic material such as an aluminum alloy. The first holder member 152 also includes a wall portion 152a extending along the periphery and a clamping portion 152b extending radially inwardly from the end of the wall portion 152a. The wall portion 152a includes a plurality of outwardly convex and concave portions 152c and 152d alternatively arranged along its periphery (FIG. 30). A connection member 154 is provided between the first and second holder members 152 and 150.

The connection member 154 is substantially formed into a ring, includes a plurality of outwardly convex and concave portions 154a and 154b alternatively arranged along its periphery. The connection member 154 is made of an elastic material which can transfer a torque and absorb a variation on the torque, such as a rubber material, preferably, chlorinated butyl rubber, acrylonitrile-butadien rubber or ethylene-propylene rubber.

During assembly, the connection member 154 is clamped between the clamping portions 150b and 152b of the first and second holder members 152 and 150 so that the outwardly convex and concave portions of the connection member 154 are mated to those of the walls 150a and 152a of the first and second holder members 152 and 150.

The thickness of the connection member 154 is slightly larger that the distance between the first and second holder members 152 and 150. Thus, the connection member 154 is pressed therebetween to ensure the positive engagement with the first and second holder members 152 and 150 through the concave and convex portions. The positive engagement connects the first and second holder members 152 and 150 through the connection member 154. Thus, the rotation is transmitted from the pulley 100 to the drive shaft 8 of the compressor 2 through the first holder member 152, the connection member 154, the second holder member 150 and the hub 115.

The operational function of the tenth embodiment will be described.

When the coil 107 is energized to start the compressor 2, the armature 111 moves to the connecting position to engage the outer surface of the end wall 104a. The rotation of the crank pulley 14 (FIG. 3) of the automobile engine is transmitted to the pulley 1 through the belts 15 (FIG. 3). The hub 115 is rotated through the positive engagement between the connection member 154 and the first and second holder members 152 and 150. Thus, the drive shaft 8 of the compressor 2 is rotated.

During the normal operation of the compressor 2, a torque, in general about 20 Nm, about the drive shaft 208 is applied onto the connection member 154 as in the first embodiment. The elastic connection member 154 can absorb a fluctuation in the torque (refer to FIG. 9). When the drive shaft 8 is locked due to the failure of the compressor 2 such as seizing, the elastic connection member 154 deforms to disconnect the positive engagement between the convex and concave portions of first and second holder members 152 and 150 and of the connection member 154.

However, the rotation of the pulley 1 does not stop which results in the connection member 154 engaging again. When the failure is slight and the drive shaft 8 is locked temporarily, the engaged connection member 154 can transmit the rotation to the drive shaft 8. Thus, the compressor 2 can operate again automatically. When a significant failure occurs in the compressor 2 and the drive shaft 208 is permanently locked, the wear and tear on the connection member 154 separate the drive shaft 8 from the pulley 111.

With reference to FIG. 32, the eleventh embodiment of the invention will be described. In the drawing and the following description, the elements similar to those of the seventh embodiment are indicated by the same reference numbers.

A rotational power transmission device according to the eleventh embodiment is substantially the same as in the fifth embodiment, except that, in the eleventh embodiment, the connection member 164 includes a plurality of bent portions 164c in the outwardly convex portions 164a. The bent portions 164c facilitate the elastic deformation of the connection member 164. The dimension and shape of the bent portions 164c are selected to obtain the desired torque which disconnects the positive engagement between the connection member 164 and the first holder member 150, and between the connection member 164 and the second holder member 152.

In the tenth and eleventh embodiments, the convex and concave portions are provided on both the first and second holder members 150 and 152. However, the convex and concave portions can be provided on either the first holder members 150 or the second holder member 152. In this case, the connection member 164 is fixed to the one which has no convex and concave portions by a suitable manner such as adhesive.

We claim:

1. A device for transmitting rotational power from an automobile engine to a compressor for use in an automobile air conditioning system, said compressor including a housing with a cylinder bore, a front flange attached to the front end of said housing, a drive shaft extending through said housing and said front flange, said drive shaft supported by said housing for rotation about the axis of said housing, and a piston engaging said drive shaft through a swash plate to slide within said cylinder bore, said device for transmitting a rotational power comprising:

a pulley, supported by a bearing on said front flange for rotation about said axis of said housing, for receiving a rotational power from said automobile engine through a V-belt extending between said pulley and said automobile engine;

a hub connected to said drive shaft;

means for rotationally connecting said pulley and hub, said connecting means comprising:

at least one elastic member substantially formed into a ring, wherein said ring defines an outer peripheral surface, an inner peripheral surface, and a radial width between said inner and outer peripheral surfaces, said radial width being substantially constant, a first holder member, defined along the outer periphery of said hub, for holding said at least one elastic member from the radially outside of said at least one elastic member, and a second holder member, connected to said pulley, for holding said at least one elastic member from radially inside of said at least one elastic member;

said first holder member defining a peripheral surface, said peripheral surface of said first holder being substantially complementary to said outer peripheral surface of said elastic member;

said second holder member defining a peripheral surface, said peripheral surface of said second holder being substantially complementary to said inner peripheral surface of said elastic member, said first and second holder members radially cooperating with each other to circumferentially hold said at least one elastic member during normal operation to transmit the rotation, and being disconnected by the deformation of said at least one elastic member when a relative rotation between said pulley and drive shaft occurs.

2. A device for transmitting rotational power according to claim 1 in which said at least one elastic member is constructed from an elastic material suitable to deform to be released from at least one of said first and second rotating members when a relative rotation between said first and second rotating members occurs.

3. A device for transmitting rotational power according to claim 1 further comprising an electromagnetic clutch which comprises a magnetic pole member with a coil, said magnetic pole member being mounted to said first rotating member;

an armature provided for rotation about said axis, said armature being movable between connecting position where said armature contacts said first rotating member and disconnecting position where said armature is separated from said first rotating member;

said first holder member being mounted to said first rotating member through said armature; and said second holder member being mounted to said second rotating member.

4. A device for transmitting rotational power according to claim 1, wherein at least one of said first and second holder members defines a peripheral surface with a plurality of outwardly convex and concave portions alternately arranged along at least one of the outer and inner periphery.

5. An air conditioning apparatus for an automobile which is provided with an automobile engine, in which the apparatus comprises:

a compressor for compressing a refrigerant gas, the compressor comprising means for compressing said refrigerant gas, and a drive shaft to move pistons;

a device for transmitting rotational power from the automobile engine to said drive shaft of said compressor, in which said rotational transmission device comprises:

a first rotating member provided for rotation in a rotational direction about an axis, said first rotating member being operatively connected to said automobile engine;

a second rotating member provided for rotation about said axis, said second rotating member being connected to said drive shaft of said compressor;

a means for rotationally connecting said first and second rotating member, said connecting means comprising:

at least one elastic member;

a first holder member for holding said at least one elastic member from the radially outside of said at least one elastic member; and a second holder member for holding said at least one elastic member from the radially inside of said at least one elastic member, said first and second holder members being mounted to one of said first and second rotating members; and said first and second holder members radially cooperating with each other to circumferentially hold said at least one elastic member during normal operation to transmit the rotation, and being disconnected by the deformation of said at least one elastic member when a relative rotation between the first and second rotating members occurs.

6. An air conditioning apparatus according to claim 5 in which said at least one elastic member is substantially formed into a ring;

said first holder member being substantially formed into ring mounted to said first rotating member to engage the outer periphery of said elastic member; and said second holder member being substantially formed into a ring mounted to said second rotating member to engage the inner periphery of said elastic member.

7. An air conditioning apparatus according to claim 6, wherein said first holder member defines a peripheral surface, said peripheral surface of said first holder being substantially complementary to said outer peripheral surface of said elastic member; and said second holder member defines a peripheral surface, said peripheral surface of said second holder being substantially complementary to said inner peripheral of surface of said elastic member, said first and second holder members radially cooperating with each other to circumferentially hold said at least one elastic member during normal operation to transmit rotation, and being disconnected by the deformation of said at least one elastic member when a relative rotation between said pulley and drive shaft occurs.

8. An air conditioning apparatus according to claim 7, wherein at least one of said first and second holder members defines a peripheral surface with a plurality of outwardly convex and concave portions alternately arranged along at least one of the outer and inner periphery.

* * * * *